United States Patent
Smith et al.

(10) Patent No.: US 9,679,279 B1
(45) Date of Patent: *Jun. 13, 2017

(54) MANAGING TRANSFER OF HOSTED SERVICE LICENSES

(75) Inventors: Korwin J. Smith, Seattle, WA (US); Hsuan-Cheng Lai, Seattle, WA (US); David Zipkin, Seattle, WA (US); Eric Jason Brandwine, Haymarket, VA (US)

(73) Assignee: Amazon Technologies Inc, Reno, NV (US)

( * ) Notice: Subject to any disclaimer, the term of this patent is extended or adjusted under 35 U.S.C. 154(b) by 1156 days.

This patent is subject to a terminal disclaimer.

(21) Appl. No.: 13/406,304

(22) Filed: Feb. 27, 2012

(51) Int. Cl.
- G06N 5/00 (2006.01)
- G06Q 20/12 (2012.01)
- G06F 7/00 (2006.01)
- G06Q 30/06 (2012.01)

(52) U.S. Cl.
CPC ............ G06Q 20/123 (2013.01); G06F 7/00 (2013.01); G06N 5/003 (2013.01); G06Q 30/06 (2013.01)

(58) Field of Classification Search
USPC .......................................... 705/59
See application file for complete search history.

(56) References Cited

U.S. PATENT DOCUMENTS

| | | |
|---|---|---|
| 4,788,637 A | 11/1988 | Tamaru |
| 5,757,908 A | 5/1998 | Cooper et al. |
| 5,870,717 A | 2/1999 | Wiecha |
| 6,664,981 B2 | 12/2003 | Ashe et al. |
| 6,735,768 B1 | 5/2004 | Tanaka |
| 6,910,071 B2 | 6/2005 | Quintero et al. |
| 7,165,041 B1 | 1/2007 | Guheen et al. |
| 7,315,830 B1 | 1/2008 | Wirtz et al. |
| 7,324,969 B2 | 1/2008 | Pallister et al. |
| 7,433,835 B2 | 10/2008 | Frederick et al. |

(Continued)

FOREIGN PATENT DOCUMENTS

| | | |
|---|---|---|
| CA | 2554462 A1 | 8/2005 |
| CN | 103959317 A | 7/2014 |

(Continued)

OTHER PUBLICATIONS

Ebay, Inc.; Ebay Advertising Targeting homepage. 2012. Accessed Feb. 17, 2012. http://www.ebayadvertising.com/en/display-ads-targeting. 1 pg.

(Continued)

*Primary Examiner* — John Hayes
*Assistant Examiner* — El Mehdi Oussir
(74) *Attorney, Agent, or Firm* — Knobbe Martens Olson & Bear LLP

(57) ABSTRACT

Systems and methods are disclosed which facilitate transfer of licenses corresponding to hosted services. Customers may purchase licenses to services implemented by a hosted computing environment. Thereafter, customers may elect to transfer all or a portion of that license to a second customer. In some embodiments, a customer may transfer the entirety of their service license. In other embodiments, a customer may transfer only a portion of their service license. In still more embodiments, a customer may temporarily transfer a license. For example, a customer may transfer a license only when they are not using the license.

22 Claims, 10 Drawing Sheets

(56) References Cited

U.S. PATENT DOCUMENTS

| | | | |
|---|---|---|---|
| 7,466,835 | B2 | 12/2008 | Stenberg et al. |
| 7,467,206 | B2 | 12/2008 | Moore et al. |
| 7,729,954 | B2 | 6/2010 | Frederick et al. |
| 7,729,955 | B2 | 6/2010 | Frederick et al. |
| 7,778,874 | B1 | 8/2010 | Saunders |
| 7,797,198 | B1 | 9/2010 | Frederick et al. |
| 7,797,271 | B1 | 9/2010 | Bonneau et al. |
| 7,801,771 | B1 | 9/2010 | Sirota et al. |
| 7,908,358 | B1 | 3/2011 | Prasad et al. |
| 7,953,642 | B2 | 5/2011 | Dierks |
| 7,958,529 | B2 | 6/2011 | Green et al. |
| 8,005,723 | B1 | 8/2011 | Sirota et al. |
| 8,019,652 | B1 | 9/2011 | Frederick et al. |
| 8,019,653 | B1 | 9/2011 | Frederick et al. |
| 8,019,660 | B2 | 9/2011 | Westphal |
| 8,024,225 | B1 | 9/2011 | Sirota et al. |
| 8,185,220 | B2 | 5/2012 | Lloyd |
| 8,442,234 | B2 | 5/2013 | Brown et al. |
| 8,601,583 | B1 | 12/2013 | Chandrasekhar et al. |
| 2002/0120461 | A1 | 8/2002 | Kirkconnell-Ewing et al. |
| 2002/0120519 | A1 | 8/2002 | Martin et al. |
| 2003/0195813 | A1 | 10/2003 | Pallister et al. |
| 2003/0217357 | A1 | 11/2003 | Parry |
| 2004/0122926 | A1 | 6/2004 | Moore et al. |
| 2004/0243583 | A1 | 12/2004 | Olsen |
| 2005/0010916 | A1 | 1/2005 | Hagen et al. |
| 2005/0039034 | A1 | 2/2005 | Doyle et al. |
| 2005/0256882 | A1 | 11/2005 | Able et al. |
| 2006/0010075 | A1* | 1/2006 | Wolf ............... G06Q 30/06 705/57 |
| 2007/0022447 | A1 | 1/2007 | Arseneau et al. |
| 2007/0067297 | A1 | 3/2007 | Kublickis |
| 2007/0118530 | A1 | 5/2007 | Chow et al. |
| 2007/0130156 | A1 | 6/2007 | Tenhunen et al. |
| 2007/0233540 | A1 | 10/2007 | Sirota |
| 2008/0080396 | A1 | 4/2008 | Meijer et al. |
| 2008/0098462 | A1 | 4/2008 | Carter |
| 2008/0103975 | A1 | 5/2008 | Taratino et al. |
| 2009/0037337 | A1 | 2/2009 | Baitalmal et al. |
| 2009/0037492 | A1 | 2/2009 | Baitalmal et al. |
| 2009/0100331 | A1 | 4/2009 | Sauve et al. |
| 2009/0119779 | A1 | 5/2009 | Dean et al. |
| 2009/0138380 | A1* | 5/2009 | Roseman ............... G06Q 30/02 235/383 |
| 2009/0235244 | A1 | 9/2009 | Enomori et al. |
| 2009/0241037 | A1 | 9/2009 | Hyndman |
| 2009/0249324 | A1 | 10/2009 | Brar et al. |
| 2009/0288082 | A1 | 11/2009 | Nazeer et al. |
| 2010/0114739 | A1 | 5/2010 | Johnston |
| 2010/0131084 | A1 | 5/2010 | Van Camp |
| 2010/0250391 | A1* | 9/2010 | Yruski ............... G06Q 30/02 705/26.1 |
| 2010/0262508 | A1 | 10/2010 | Volnak |
| 2011/0119191 | A1 | 5/2011 | Stern et al. |
| 2011/0126110 | A1 | 5/2011 | Vilke et al. |
| 2011/0173028 | A1 | 7/2011 | Bond |
| 2011/0214124 | A1 | 9/2011 | Ferris et al. |
| 2011/0314556 | A1* | 12/2011 | Dicke ............... G06F 21/10 726/27 |
| 2012/0054731 | A1 | 3/2012 | Aravamudan et al. |
| 2012/0278229 | A1 | 11/2012 | Vishwanathan et al. |
| 2012/0278439 | A1 | 11/2012 | Ahiska et al. |
| 2013/0060661 | A1* | 3/2013 | Block ............... G06F 21/10 705/26.44 |
| 2013/0085892 | A1 | 4/2013 | Golden et al. |
| 2013/0085899 | A1 | 4/2013 | Tyra et al. |
| 2014/0109046 | A1 | 4/2014 | Hirsch et al. |

FOREIGN PATENT DOCUMENTS

| | | | |
|---|---|---|---|
| CN | 104115177 A | 10/2014 | |
| EP | 2761555 A | 8/2014 | |
| EP | 2761558 A | 8/2014 | |
| GB | 2426362 | 11/2006 | |
| JP | 2003-44602 | 2/2003 | |
| JP | 2007-149096 A | 6/2007 | |
| JP | 2010-277187 A | 12/2010 | |
| JP | 4743726 B1 | 8/2011 | |
| WO | WO 2005/072342 A2 | 8/2005 | |
| WO | WO 2013/049393 | 4/2013 | |
| WO | WO 2013/049393 A1 | 4/2013 | |
| WO | WO 2013/049395 | 4/2013 | |
| WO | WO 2013/049395 A1 | 4/2013 | |
| WO | WO 2013049395 A1 * | 4/2013 | ............. G06Q 30/06 |

OTHER PUBLICATIONS

Ranganathan et al., Advertising in a Pervasive Computing Environment, University of Illinois, pp. 6, Urbana, IL.

International Search Report and Written Opinion in PCT/US2012/057526 mailed Dec. 24, 2012.

International Search Report and Written Opinion in PCT/US2012/057624 mailed Dec. 6, 2012.

Doumae, K. Cloud in Japan—II Probation into Ability of GIO, Chapter 1—Cloud in Japan and IIJ GIO, G-Cloud Magazine, Japan, K.K. Gijutsu Hyoronsha, Sep. 10, 2010, pp. 100-101.

Nakata, A., Close up, Nikkei computer, No. 789, Nikkei Business Publications, Inc., Aug. 18, 2011, pp. 68-75.

Shimizu, M., EC2/S3/EBS, Virtual Server Construction by Cloud Computing, 1st ed., Socym Co., Ltd., Shoichiro Takeda, Aug. 27, 2009, pp. 128-138.

Taniguchi, T., Cloud in Japan—II Probation into Ability of GIO, Chapter 2—Using IIJ Cloud: It's Simple! Establishing the Web Server by Using the GIO Hosting Package, G-Cloud Magazine, Japan, K.K. Gijutsu Hyoronsha, Sep. 10, 2010, pp. 102-109.

Taniguchi, T., Cloud in Japan—II Probation into Ability of GIO, Chapter 3—Full-Scale! Example of Structuring Using GIO Component Service—Encouraging Full-Scale Cloud Infrastructure with Parts Selected and Used, G-Cloud Magazine, Japan, K.K. Gijutsu Hyoronsha, Sep. 10, 2010, pp. 110-117.

International Preliminary Report on Patentability received in PCT/US2012/057624 dated Apr. 1, 2014.

Supplementary Search Report received in European Application No. 12834770.5 dated Apr. 10, 2015.

Office Action received in Japanese Application No. 2014-533330 dated Mar. 2, 2015.

Office Action received in Australian Application No. 2012315939 dated Mar. 10, 2015.

Office Action received in Singapore Application No. 2014012645 dated Mar. 27, 2015.

Office Action received in Canadian Application No. 2850008 dated May 19, 2015.

Office Action received in Australian Application No. 2012315941 dated Mar. 10, 2015.

Office Action received in Japanese Application No. 2014-533331 dated Feb. 23, 2015.

Supplementary Search Report received in European Application No. 12835825.6 dated Jul. 14, 2015.

Office Action received in Canadian Application No. 2,850,011 dated Sep. 1, 2015.

Office Action received in Japanese Application No. 2014-533331 dated Sep. 3, 2015.

Office Action received in Australian Application No. 2012315939 dated May 19, 2015.

Office Action received in Russian Application No. 2014117208 dated Nov. 30, 2015.

\* cited by examiner

MANAGING TRANSFER OF HOSTED SERVICE LICENSES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance configurations are often contained within a service image, which a host computing device may execute in order to implement the desired specific functionality of the virtual machine instance.

In one embodiment, the service image, when executed by virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing the applications and computing resources available from a data center for specific purposes.

Generally, a license may be required in order to implement a service image or services included within a service image. These licenses may include various terms of use. In some instances, licenses may be for a fixed term (e.g., 1 year). In other instances, licenses may require a fee for use during a time period (e.g., 1 dollar per hour of use). Licenses may contain additional or alternative terms. Further, licenses may include combinations of any such terms.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where.

DETAILED DESCRIPTION

Figure 1:
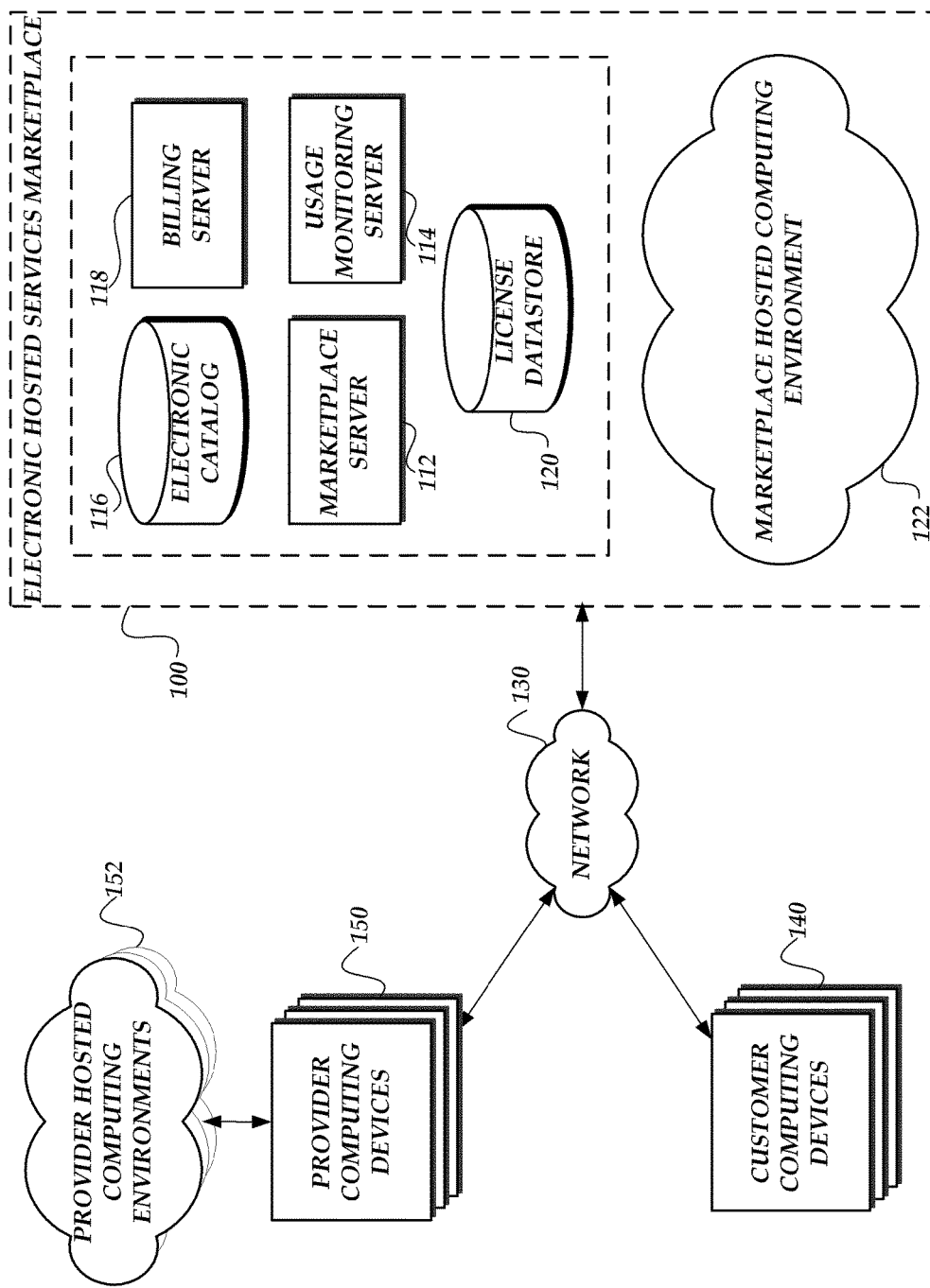
FIG. 1 is a schematic block diagram depicting an illustrative operating environment in which an electronic services marketplace enables customers to browse descriptions of services, and acquire licenses to services made available in the marketplace.

Generally described, aspects of the present disclosure relate to managing transfer of licenses corresponding to services available from an electronic services marketplace. More specifically, an electronic services marketplace is provided that permits users to browse descriptions of services, such as service images implementing desired functionalities or services. The service images may be submitted to, and made available from, the electronic services marketplace, by third party providers or may be submitted to the marketplace by the operator of the marketplace itself. A customer may purchase licenses to implement service images or corresponding services via a hosted computing environment. Once a corresponding license has been acquired through the electronic services marketplace, a service image may be launched on a hosted computing environment maintained by the third party provider of the service image or on a hosted computing environment associated with the marketplace. As discussed in greater detail below, embodiments of the electronic services marketplace may enable customers to transfer licenses corresponding to services or service images to other customers of the electronic services marketplace. In some embodiments, a service license may be valid for a fixed period of time. For example, a service license may correspond to a license to implement the service for a 1 month period. In these embodiments, a customer may transfer all or a portion of any remaining license period to another customer.

In some embodiments, a customer may temporarily transfer a service license in exchange for a fee. Illustratively, in the example above, the customer may not implement the service at all times during the 1 month license period. In these embodiments, the customer may be enabled to temporarily transfer the service license during periods in which the service license would not otherwise be used. Illustratively, temporary transfer of the service license may be associated with an hourly cost of $0.50 an hour. Such a temporary transfer may be beneficial to the selling customer, as it may allow recoupment of costs associated with acquiring the 1 month license. Further, such a temporary transfer may be beneficial to a purchasing customer, as it may enable implementation of the service for a lower cost than purchasing the full 1 month service license.

In some embodiments, transfer of licenses may require consent of the initial provider or licensor of the service. For example, where the service corresponds to a database, the owner, creator, or licensor of the database may be required to give consent in order for a license to the database to be transferred on the electronic service marketplace. Illustratively, enabling transfer of licenses may increase sales of a service by reducing risk associated with purchase of the service, and may therefore benefit an initial provider. In some embodiments, transfer or temporary transfer of licenses may result in payment to an initial provider of a service. For example, an initial provider may receive a flat or percentage fee for each transfer of a service license. One skilled in the art will appreciate that the ability to transfer licenses and any fees associated with such transfer may be governed by the license agreement entered into between an initial provider and initial licensee of a service.

Though generally referred to herein with respect to service images, services available via the electronic services marketplace may, in some embodiments, be implemented without use of a service image. For example, the electronic services marketplace may include services providing access to applications or data sets, either of which may or may not be associated with a service image. In addition, the electronic services marketplace may provide access to either partially or wholly human-provided services. Illustratively, such human-provided services may correspond to customer services or to technical support services. As such, though reference to service images may be made below, the current disclosure should not be limited to facilitating transfer of licenses related to service images, but may encompass facilitating transfer of licenses related to any service available from and provided by an electronic services marketplace.

Embodiments discussed below may refer to the users of an electronic services marketplace for service images as customers. However, it may be understood that users are not limited to customers but may include owners, administrators, end users, and providers of service images purchased from the electronic services marketplace.

Embodiments of an electronic services marketplace which may offer service images for acquisition may be found in U.S. patent application Ser. No. 13/248,227, filed on Sep. 29, 2011, and entitled, "ELECTRONIC SERVICES MARKETPLACE FOR HOSTED SERVICE IMAGES," the entirety of which is hereby incorporated by reference (the "'227 Application"). In brief, the electronic services marketplace may provide an environment with which both providers and customers of service images can interact via a network. In one embodiment, a provider may submit a service image to the electronic services marketplace for inclusion in an electronic catalog. The provider may submit additional information corresponding to the service image that would be useful to a customer, such as pricing information, usage conditions, a location of a provider hosted computing environment on which the service image can be hosted, or other information.

Customers may employ a user computing device to browse the electronic catalog by interaction with various user interfaces generated by the electronic services marketplace, described in greater detail below. On identifying a service image of interest, the customer may view details of each service image in the electronic catalog, such as the information submitted by the provider of the service image. In some embodiments, a customer may view further information associated with a service image, such as usage statistics by other marketplace customers of the service image, reviews by other customers, or recommendations for similar or complementary service images. Accordingly, service images may be surfaced to customers in a variety of ways by the services marketplace, such as by navigation through a browse tree of services organized by function, type, size, etc. or through recommendations, reviews, etc.

Once a customer selects a service image, the customer may purchase or otherwise acquire the service image from the services marketplace. In some embodiments, the customer may be required to submit payment information for the service image prior to launch of the service image. After acquisition of the service image by the customer, the service image may be launched and executed by one or more hosted computing environments. The hosted computing environment may be provided by an operator of the services marketplace or may be otherwise associated with the services marketplace. In some embodiments, the third party provider of the acquired service image may provide a hosted computing environment for the service image acquired by the customer via the services marketplace.

Once a service image is launched and running on a hosted computing environment, the services marketplace can monitor the usage of functionality or services provided by service image and bill the customer/pay the provider accordingly. Moreover, the services marketplace may provide the customer with tools to manage, monitor, modify, etc. the service image.

In according with embodiments of the present disclosure, acquisition of a service image on the electronic services marketplace may be associated with acquisition of a license corresponding to a service image or a service. For example, if a customer acquires and launches an instance of the service image, they may further acquire a license to operate the service image subject to certain terms. Terms of a service license may include fees associated with the license or operation of the service. These fees may include, but are not limited to, a fixed cost to purchase the license, a time-dependent fee for operation of the service corresponding to the license (e.g., X dollars per minute, hour, day, etc.), or fees associated with other usage or operation of the service (e.g., X dollars per gigabyte of data transfer or storage, X dollars per operation of the service, etc.). One skilled in the art will appreciate that services may be associated with various additional or alternative fee structures. Terms of a license may further include provisions for allowing or disallowing transfer of the license to another party. For example, the license may enable a customer to transfer all or a portion of a license, or enable temporary transfer of a license. In some embodiments, transfer of the license may be associated with additional fees to the initial provider of the service. Illustratively, transfer of a license may be associated with a one time fee paid to the provider of the service, or with a recurring fee (e.g., per hour of use of the transferred license). In some embodiments, these transfer fees may be in addition to any fees normally associated with use of a service license (e.g., within the terms of the license).

By way of illustrative example, customer A may hold a license from provider P corresponding to a hosted service. The terms of this license may include payment of a usage-independent fee (e.g., $100 per month) as well as a usage-dependent fee (e.g., $1 dollar per hour of use of the license). In this illustrative example, use of a license may correspond to implementing the service on a hosted computing environment. Illustratively, use of a license may correspond to executing a service image implementing the service on a hosted computing environment. As such, customer A may therefore purchase the license by paying $100 for a first month, and additional fees depending on his use of the license. However, before the end of the license period of 1 month, customer A may decide he no longer desires the license. In order to recoup some of the initial 1 month fee paid, customer A may wish to transfer his license to customer B. In this illustrative example, customer A may have held the license for 7 days, leaving 23 days remaining (assuming a 30 day month). As such, customer B may agree to acquire the remaining 23 days of the license in exchange for a fee paid to customer A of $50. Customer B may then implement the service according to the terms of the license, including paying $1 per hour of use of the license to provider P. In this illustrative example, customer A is able to recoup some of the initial cost of the license which otherwise may have been lost. Customer B is able to acquire a license at less initial cost or duration than is generally required. Further, provider P still receives the initial $100 cost of the license, as well as additional hourly fees that may otherwise have not been charged.

In some embodiments, offering of a license may temporarily revoke use of the license by the offering customer. Illustratively, such a revocation may correspond to pausing any remaining time period associated with an acquired license. Further, offering the license for transfer may prevent Customer A from utilizing the license (e.g., to implement the corresponding service). In other embodiments, offering a license for transfer may not prevent a customer from implementing a service corresponding to the license. In these embodiments, a time period corresponding to the license may continue to diminish as governed by the terms of the license. For example, if Customer A initially offered the 23 days remaining on the license, but the offer was not accepted for 3 days, only 20 days may then remain on the license. In still more embodiments, a remaining period of a license may be determined at least in part based on utilization of a license. Illustratively, the time remaining on the license may only diminish for periods where the license is in use. For example, if a license with an initial period of 7 days is used for 3 days, 4 days may remain on the license, regardless of when the 3 days occurred or whether the 3 days were simultaneous. One skilled in the art will appreciate that the "use" of a license may be measured on various time scales or granularities. For example, any period of use during a 24 hour period may constitute 1 day of use. In these embodiments, offering a license for transfer may still enable a selling customer to utilize the license, though use of the license may reduce any remaining portion which is offered for transfer.

As described above, in some embodiments, transfer of license may be associated with payment of additional fees to a provider. Illustratively, in the example given above, transfer of a license from customer A to customer B may require a payment of $10 to provider P. As such, customer A may only receive $40 for the sale of the license (or, similarly, customer B may be required to pay $60). Payment of such a fee may incentivize providers to more readily agree to transfers of licenses. In some embodiments, a transfer fee may be a percentage of a price paid (e.g., 10% of the $50 transfer price).

As described above, in some embodiments, customers may temporarily transfer licenses. For example, customer A may again acquire a 1 month license for an initial $100 fee and a $1 per hour usage fee. However, customer A may not use the license at all times during the 1 month. As such, customer A may wish to temporarily grant the license to another customer in order to recoup some of the initial cost of the license. For example, customer A may temporarily lease the license to customer C during periods when customer A is not using the license. This may enable customer C to utilize the license without paying the initial $100 fee for a 1 month license. Because the terms of the license require a $1 per hour usage fee, customer A may temporarily transfer the license to customer C for an added fee of $0.25 per hour. For the purposes of billing, in some embodiments, customer C may pay $1.25 an hour to customer A (who would then pay $1 to provider P). In other embodiments, customer C may pay $1 per hour directly to provider P as well as an additional $0.25 per hour to customer A. In this manner, customer C may access the license without incurring the initial $100 per hour charge normally associated with acquiring the license. Customer A may recoup some of the initial $100 charge by gaining $0.25 per hour for the temporarily transferred license. Provider P may reduce the risk associated with purchasing the license (thereby increasing sales), as well as gain additional revenue for additional hours of use by Customer C.

In the above described example of temporarily transferring a license, the license may revert to customer A as soon as customer A desires to use the license. This may correspond to starting an instance utilizing the service corresponding to the license. In some embodiments, this may result in halting use of the license by customer C. However, in some embodiments, multiple additional customers may also wish to temporarily transfer their similar licenses. Each of these additional customers may charge a slightly different amount for use of their license (e.g., the $1 per hour plus $0.30, plus $0.40, or plus $0.50). As such, customer C may specify a maximum price per hour for a temporary license (e.g., $1.40 an hour total). The electronic services marketplace may then enable customer C to acquire the lowest priced license that meets the customer's criteria. For example, if customer A begins to utilize his license, customer C may automatically acquire a temporary license from one of the additional customers for a price of $1.30 per hour. Should that customer begin to use their license, customer C may automatically acquire a temporary license from yet another of the additional customers for a price of $1.40 per hour. In the event that no additional licenses are available for less than the maximum price specified by customer C, all use of the license by customer C may be halted.

Similarly to as described above, temporary transfer of a license may be associated with a transfer fee paid to a provider. For example, provider P may receive $0.05 cents for every hour a temporary license is transferred, either increasing the price paid to acquire a temporary license or reducing the fee received by a temporary licensor. In some embodiments, a transfer fee may correspond to a percentage of the fee paid to the transferring customer. As described above, imposition of transfer fees may increase the willingness of providers to allow transfers of licenses.

The simplified examples described above are intended to convey some, but not all, potential embodiments and applications of the present disclosure. One skilled in the art will appreciate that licenses and transfers thereof may be customized according to the desires of the transferor, the transferee, and the initial provider of the license. For example, permanent transfer of a license may be associated with a per-usage fee (e.g., the hourly usage fee of a transferred license is increased by $0.10). Further, temporary transfer of a license may be associated with a one time fee (e.g., $0.01 for every new transfer of a temporary license). In addition, licenses may be associated with additional or alternative fees not discussed herein. In some embodiments, any of the above fees may be combined within a license. Still further, terms of a license may include provisions further detailing the conditions under which transfers of licenses may or may not occur. One skilled in the art will appreciate that licenses may include any of a variety of additional or alternative terms.

With reference to FIG. 1, an illustrative operating environment is shown which includes an electronic services marketplace 100 that enables customers to browse descriptions of services available from the electronic services marketplace 100. The electronic services marketplace 100 may further enable customers to acquire licenses corresponding to services made available in the electronic services marketplace 100 by third party providers or the operator of the electronic services marketplace 100. Services corresponding to acquired licenses may be implemented within a hosted computing environment, as discussed in greater detail below.

As illustrated in FIG. 1, the operating environment includes one or more provider computing devices 150 and one or more customer computing devices 140 in communication with an electronic services marketplace 100 via a network 130. A third party provider, using a provider computing device 150, may submit via the network 130 a service or service image implementing a service to the electronic services marketplace 100. The third party provider may additionally submit license information associated with use or acquisition of the service on the electronic services marketplace 100. The electronic services marketplace 100 may make the submitted service, as well as other services or service images implementing services, available to customers.

Accordingly, a customer, using his or her customer computing device 140, may communicate with the electronic services marketplace 100 regarding services made available by the electronic services marketplace 100. In one embodiment a customer may communicate with the electronic services marketplace 100 in order to browse descriptions of services made available by the electronic services marketplace 100, including the availability of licenses corresponding with the service and any terms of such licenses. In another embodiment, a customer may communicate with the electronic services marketplace 100 in order to acquire a license for a desired service. In a further embodiment, a customer may communicate with the electronic services marketplace 100 in order to launch a service corresponding to the acquired license. Launching of a service may occur within a marketplace hosted computing environment 122 operated, maintained, provided or otherwise associated with the operator of the electronic services marketplace 100. In alternative embodiments, where an acquired service was submitted to the electronic services marketplace 100 by a third party provider, the acquired service may be launched in a provider hosted computing environment 152 that is operated, maintained, provided or otherwise associated with the third party provider.

A hosted computing environment (e.g., marketplace hosted computing environment 122 or provider hosted computing environment 152) may include a collection of rapidly provisioned and released computing resources hosted in connection with the marketplace or a third party provider. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586 entitled "Configuring Communications Between Computing Nodes" and issued Jan. 4, 2011, which is hereby incorporated by reference in its entirety. A hosted computing environment may also be referred to as a cloud computing environment.

Though described herein with reference to hosted computing environments associated with a provider of a service and with the electronic services marketplace 100, in some embodiments, additional hosted computing environments may be utilized. For example, a customer computing device 140 may provide a customer hosted computing environment (not shown), or a third party may provide a third party hosted computing environment (not shown). Any or all of these additional hosted computing environments may be accessible to the electronic services marketplace 100, and may be utilized to host services available from the electronic services marketplace 100. For purposes of brevity, such additional hosted computing environments may also be referred to herein as "provider hosted computing environments."

The provider computing devices 150 and the customer computing devices 140 may communicate with the electronic services marketplace 100 via a network 130. The provider computing device 150 or customer computing device 140 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like.

Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

The electronic services marketplace 100 is illustrated in FIG. 1 as operating in a distributed computing environment comprising several computer systems that are interconnected using one or more networks. More specifically, the electronic services marketplace 100 may include a marketplace server 112, a usage monitoring server 114, an electronic catalog 116, a billing server 118, and a license datastore 120 discussed in greater detail below. However, it may be appreciated by those skilled in the art that the electronic services marketplace 100 may have fewer or greater components than are illustrated in FIG. 1. In addition, the electronic services marketplace 100 could include various Web services and/or peer-to-peer network configurations. Thus, the depiction of the electronic services marketplace 100 in FIG. 1 should be taken as illustrative and not limiting to the present disclosure.

Any one or more of the marketplace server 112, the usage monitoring server 114, the electronic catalog 116, the billing server 118, and the license datastore 120 may be embodied in a plurality of components, each executing an instance of the respective marketplace server 112, usage monitoring server 114, electronic catalog 116, billing server 118, and license datastore 120. A server or other computing component implementing any one of the marketplace server 112, the usage monitoring server 114, the electronic catalog 116, the billing server 118, and the license datastore 120 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 112, usage monitoring server 114, electronic catalog 116, billing server 118, and license datastore 120. The memory may generally include RAM, ROM, other persistent and auxiliary memory, and/or any non-transitory computer-readable media.

With further reference to FIG. 1, illustrative components of the electronic services marketplace 100 will now be discussed. The marketplace server 112 may facilitate network submission by third party providers, and browsing and acquisition by customers, of service images in the electronic services marketplace 100. Accordingly, a provider, utilizing a provider computing device 150, may submit one or more services (e.g., in the form of a service image) to the electronic services marketplace 100 via the marketplace server 112. The submitted services may then be included in an electronic catalog 116. The process by which a provider, utilizing a provider computing device 150, submits a service to the electronic services marketplace 100 is described in greater detail in the '227 Application.

A provider, utilizing a provider computing device 150, may further specify licensing information corresponding to a submitted service. For example, a provider may specify fee information associated with the license, may specify whether a license corresponding to the service may be transferred, and under what conditions such a license may be transferred.

The electronic catalog 116 may include information on services available from a plurality of providers and on services made available by the operator of the electronic services marketplace 100. Accordingly, the marketplace server 112 may obtain service information for services offered by a plurality of providers and the marketplace 100 and make information regarding the services available to a customer from a single network resource, such as a Web site. A customer may then acquire a license corresponding to a service from the electronic services marketplace 100 and launch the service in accordance with the license on a hosted computing environment (e.g., the marketplace hosted computing environment 122 or the provider hosted computing environment 152) in a single interaction or order placed with the electronic services marketplace 100. Beneficially, this eliminates the need for the customer to develop his or her own service; or research, search or otherwise investigate multiple different providers or other sources for the service.

Illustratively, marketplace server 112 may generate one or more user interfaces through which a customer, utilizing a customer computing device 140, may browse services made available by the electronic services marketplace 100, submit queries for matching services, view licensing information and details regarding specific services, acquire a license corresponding to a service, and implement the service on a hosted computing environment. An illustrative process by which a customer computing device 140 may query the electronic services marketplace 100, and by which the marketplace server 112 generates a user interface, is described in more detail in the '227 Application incorporated by reference above.

After the customer selects a desired service from the electronic services marketplace 100, the marketplace server 112 may facilitate the acquisition of a license corresponding to the service, as well as configuration the service. Information associated with a purchased license may be stored in a license datastore 120. Illustratively, the license datastore 120 may include, for each customer, information regarding licenses acquired by the customer. License information may correspond to, for example, time of acquisition of the license, terms of the license, the source of the license (e.g., from the service provider or from another customer), as well as additional or alternative license information. The marketplace server 112 may further facilitate the launching of the service image on a hosted computing environment. In this regard, the marketplace server 112 may receive payment information from the customer computing device 140, as well as information specifying how the service should be implemented by a hosted computing environment. In some embodiments, the customer may select a specific hosted computing environment to host the selected service. The specific hosted computing environment may correspond, for example, to the marketplace hosted computing environment 122 associated with the electronic services marketplace 100, or to a provider hosted computing environment 152 which is associated with the provider of the service.

Once the service is launched and running on a hosted computing environment, the electronic services marketplace 100 can monitor the usage of the service (or service image implementing a service) and bill the customer/pay the provider accordingly via the usage monitoring server 114 and the billing server 118, respectively. Moreover, the electronic services marketplace 100 may provide the customer with tools to manage, monitor, modify, etc. the service, service image implementing the service, or licenses corresponding to the service.

The billing server 118 is provided to process payments from customers and, in some embodiments, provide payment to the providers of acquired services. The billing server 118 may receive and provide payment information via interaction with the marketplace server 112. In some embodiments, the billing server 118 may alternatively receive and provide payment information via other processes, such as via an additional server, via telephonic interaction, or other mechanisms.

In the illustrated example, the marketplace server 112 may further facilitate transferring a license corresponding to a service. As will be described in greater detail below, the marketplace server 112 may enable customers to offer their acquired licenses for temporary or permanent sale. Customers may specify terms of the transfer, such as a price associated with the transfer. Further, customers may browse and select licenses offered for transfer by other customers. Upon selection of a license for transfer, a customer may purchase the license corresponding to a service in the same manner as is described above with respect to purchases from a license provider. Thereafter, information within the license datastore 120 may be modified to reflect a new holder of the license.

In embodiments where transfer of a license is temporary, the marketplace server 112 may facilitate input of criteria for temporary transfer (e.g., a maximum per hour price to pay for a temporary license) as well as actions to take as a result of temporary transfer (e.g., launching an instance of a service corresponding to a temporary license). The usage monitoring server 114 may monitor use of temporary licenses by the transferor in order to determine when licenses are available for temporary transfer. When licenses are available for temporary transfer, the marketplace server 112 may facilitate temporary transfer of the license. In some embodiments, temporary license information may be stored in the license datastore 120.

The billing server 118 may receive information regarding transfers of licenses (either temporary or permanent) and bill the transferring customer as well as the receiving customer accordingly. For example, the billing server 118 may charge a one time fee associated with the transfer to the customer purchasing the transferred license. Further, the billing server 118, in conjunction with the usage monitoring server 114 may bill a customer purchasing a transferred license and provide payment to the customer who transferred the license. In some embodiments, such billing may be in addition to the billing normally associated with use of the license (e.g., fees paid to the provider of a service).

As described above, in some embodiments, the electronic services marketplace 100 may provide a variety of services, such as access to software applications, data sets, or either partially or wholly human-provided services. As will be appreciated by one skilled in the art, the illustrative components of FIG. 1 may enable the electronic service marketplace 100 to provide any one or more of these services.

Figure 2:
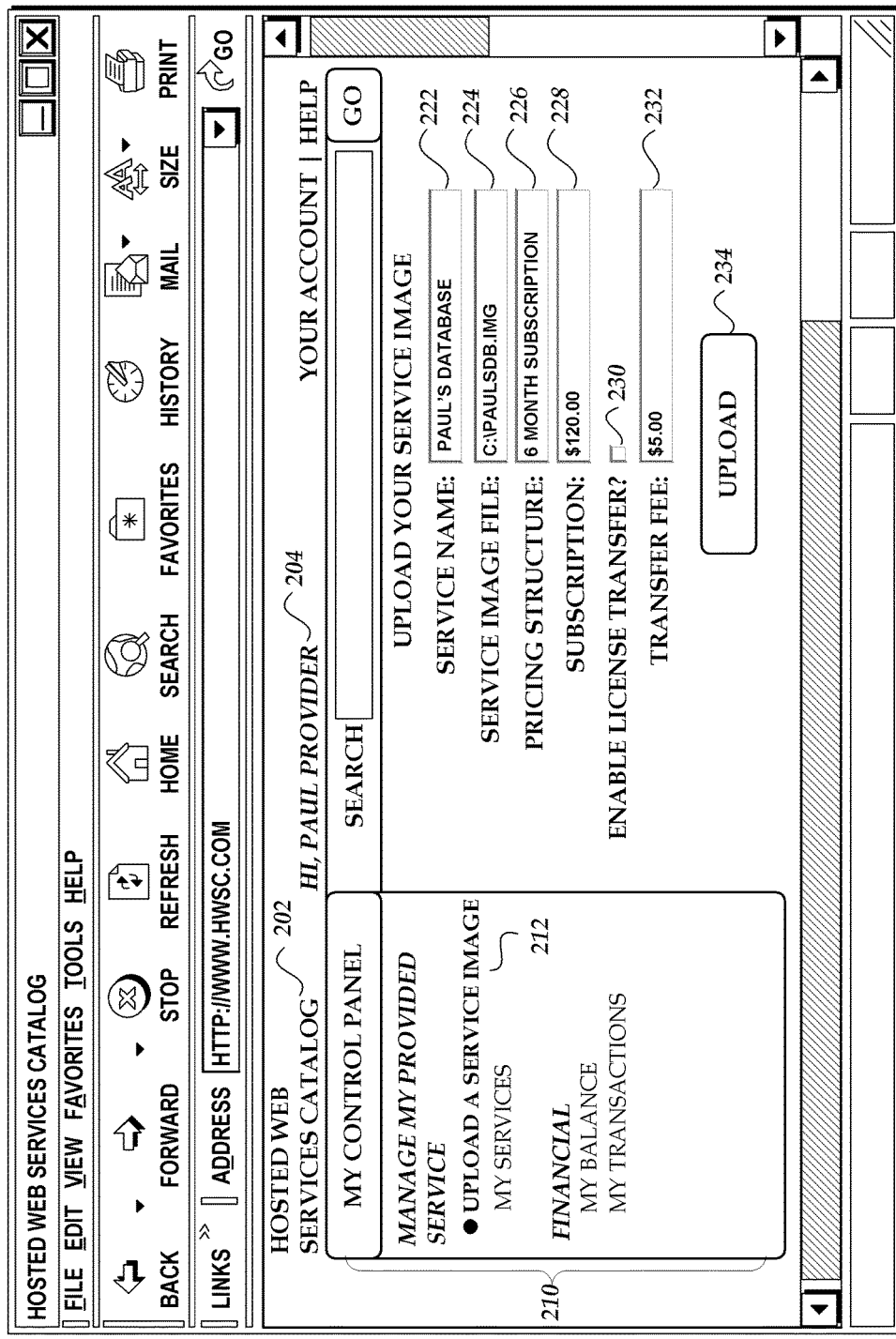
FIG. 2 depicts an illustrative user interface displayed on a provider computing device that enables a provider to submit a service for inclusion in the services marketplace shown in FIG. 1.

With reference to FIG. 2, one example of a user interface 200 for provider submission of a service is displayed. As shown in FIG. 2, the user interface 200 enables a provider utilizing a provider computing device, such as provider computing device 150 of FIG. 1, to submit a service to the electronic services marketplace 100. The user interface 200 may be generated by the marketplace server 112 of the electronic services marketplace 100 and presented on the provider computing device 150 by an application, such as a browser application, on the provider computing device 150. In this illustrative example, the submitted service corresponds to a service image implementing a software application on a hosted computing environment. The user interface 200 contains a title reference 202 to the electronic services marketplace 100, i.e., the "Hosted Web Services Catalog," as well as a salutation 204 to the provider currently visiting the electronic service image marketplace 100. In the illustrated example, the provider is identified as "Paul Provider." The user interface 200 further contains a navigation panel 210, which directs the provider to various other features offered by the electronic service image marketplace 100. Illustratively, units of text within the navigation panel 210 may correspond to interactive links, which modify or change the user interface when selected. In the current example, Paul Provider, has selected link 212, "Upload a Service Image." Based on this selection, the marketplace server 112 has returned the content for user interface 200.

Through the user interface 200 the provider may submit information associated with a service image to the electronic service image marketplace 100. The provider, utilizing a provider computing device 150 may submit, via input box 222, an identifier of the service image to be used by the electronic services marketplace 100. This may be the name displayed to customers of the electronic services marketplace 100 when they view, browse, or search the electronic services marketplace 100. The provider may submit additional information, such as a file location (e.g., a file name or address), and pricing information via inputs 224-230. Input box 224 allows the provider to specify the device image that is to be submitted, and that may thereafter be hosted by a hosted computing environment on behalf of a customer. In the illustrated example, the service image location is a location on the provider computing device 150, as is displayed in FIG. 2. In other embodiments, the service image file may be located on another computing device, such as a computing device within a provider hosted computing environment 152, or a computing device within the marketplace hosted computing environment 120 associated with the electronic services marketplace 100. The device image may also include the instruction sets that are to be associated with the uniform and customized control objects. Alternatively, separate files that include the instruction sets that are to be associated with the control objects can be uploaded using additional input boxes.

In the illustrated example, input boxes 226-230 enable a provider to specify pricing information associated with acquiring a license to the submitted service image. For example, input box 226 enables the provider to specify a pricing structure associated with a service image such as a pricing structure requiring a subscription rate, an hourly usage fee, or other fee arrangements. Examples of additional pricing structures are discussed in more detail in the '227 Application.

A provider may further specify parameters related to transferring a license corresponding to a submitted service. Illustratively, input box 230 may enable a provider to specify whether customers of a service are able to transfer a license corresponding to the service. For example, if input box 230 were not selected by a Paul Provider, customers of the "Paul's Database" service may not be able to transfer licenses corresponding to the database. If input box 230 were selected by Paul Provider, customers who have acquired a license to "Paul's Database" may be enabled to transfer those licenses to other customers. Further, input box 232 may enable a provider to specify a fee associated with transfer of such a license. In the illustrative interface of FIG. 2, Paul Provider has specified that a $5 fee should be assessed for each transfer of a license. For example, if Customer A wishes to transfer a license corresponding to "Paul's Database" to Customer B, a $5 fee would be assessed that is payable to Paul Provider. In some embodiments, Customer B may pay this fee in conjunction with any other fees due to Customer A or to the electronic services marketplace 100. In other embodiments, Customer A may pay this fee. In still more embodiments, a provider may elect to make licenses transferable without imposing fee. Though described herein as a flat transfer fee, one skilled in the art will appreciate that additional fee structures may be used. For example, a transfer fee may correspond to an hourly fee, a fee based on use of the service, or additional structures. In some embodiments, the structure of a transfer fee may be at least partially based on the pricing structure associated with a service.

Though the illustrative user interface 200 of FIG. 2 depicts an input control 230 related to transfer of a license, the user interface 200 may include additional or alternative input controls related to enabling temporary transfer of a license. For example, an input control may be provided enabling providers to allow or disallow temporarily transfer a license during times when that license is not otherwise in use. Additional or alternative input controls may also enable a provider to specify transfer fees associated with temporary transfer of a license. Moreover, though not depicted herein, transfer fees on transfers of licenses (temporary or otherwise) may be imposed by additional parties, such as the electronic services marketplace 100.

After all information has been input by a provider, submission may be completed by selecting the input control 234. Accordingly, the provider may activate the input control 234 to cause the provider computing device 150 to transmit the service or information related to the service the electronic services marketplace 100. Thereafter, a customer can submit a query for services available from the electronic services marketplace 100 and use a user interface to display information related to different services of interest. The customer can purchase and/or acquire the services available from the electronic services marketplace 100, as described in greater detail in the '227 application.

Figure 3:
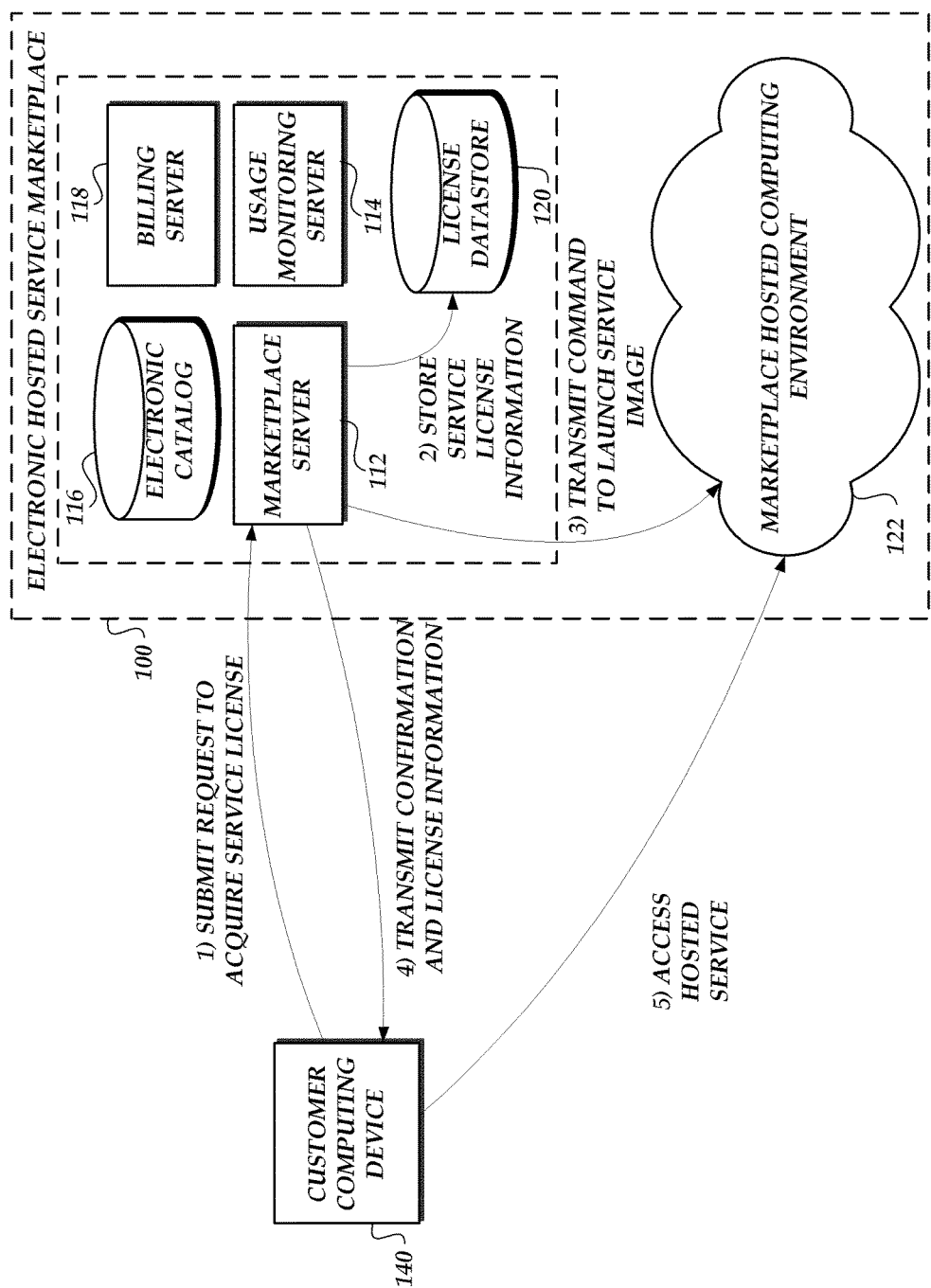
FIG. 3 is a block diagram depicting the acquisition of a service license by a customer, storage of information relating to the service license, and launching of the acquired service on a hosted computing environment associated with the services marketplace shown in FIG. 1.

FIG. 3 is a block diagram depicting the acquisition of a license corresponding to a service by the customer and launching of the service on a hosted computing environment associated with the electronic services marketplace 100. In this regard, a customer utilizing a customer computing device 140, may, at (1), request to acquire a license corresponding to a service that the customer has found and selected from the electronic services marketplace 100. The request may, for example, be processed by the marketplace server 112 of the electronic services marketplace 100. After receiving the request to acquire a license corresponding, the marketplace server 112 may, at (2), store information corresponding to the customer's acquisition of the license in the license datastore 120. Illustratively, the license information within the license datastore 120 may be inspecting prior to launching an instance of the service on a hosted computing environment. In some embodiments, such inspection may be carried out by the marketplace server 112. In other embodiments, a hosted computing environment, such as the marketplace hosted computing environment 122, may be configured to verify that license information exists within the license datastore 120 before launching a service. The customer-submitted request to acquire a service license may further correspond to a request to cause the service to be executed on the marketplace hosted computing environment 122. As such, at (3), the marketplace server 112 may transmit a command which causes the launch of the service image on a hosted computing environment. For the purposes of illustration, this command is depicted as transmitted from the marketplace server 112. As will be appreciated by one skilled in the art, one or more intermediary servers in the electronic services marketplace 100 may be required in order to transmit the command to launch the service image. Further, in some embodiments, the marketplace server 112 may interact with the electronic catalog 116 to acquire service image implementing the selected service before transmitted the command to launch. In these embodiments, the marketplace server 112 may further transmit such a service image to the selected hosted computing environment.

With respect to FIG. 3, the selected hosted computing environment is the marketplace hosted computing environment 120. However, as will be appreciated by one skilled in the art, the selected hosted computing environment may in some embodiments correspond to a provider computing environment, such as a provider computing environment 152 of FIG. 1. Launching of a service on a hosted computing environment is described in more detail within the '227 Application.

Subsequent to launching the customer selected service, the marketplace server 112 may, at (4) transmit a confirmation to the customer computing device 140, as well as information regarding the hosted service. Such information may include the location of the computing device implementing the service and any access information required to access the computing device hosting the service.

Subsequent to receiving confirmation of launch and relevant hosting information, the customer computing device 140 may, at (5) access the computing device hosting the service. Illustratively, in some embodiments, implementation of the service by a hosted computing environment may correspond to use of the acquired license corresponding to the service. In other embodiments, use of a license may correspond to accessing, by the customer computing device 140, the service implemented by the hosted computing environment.

Figure 4A:
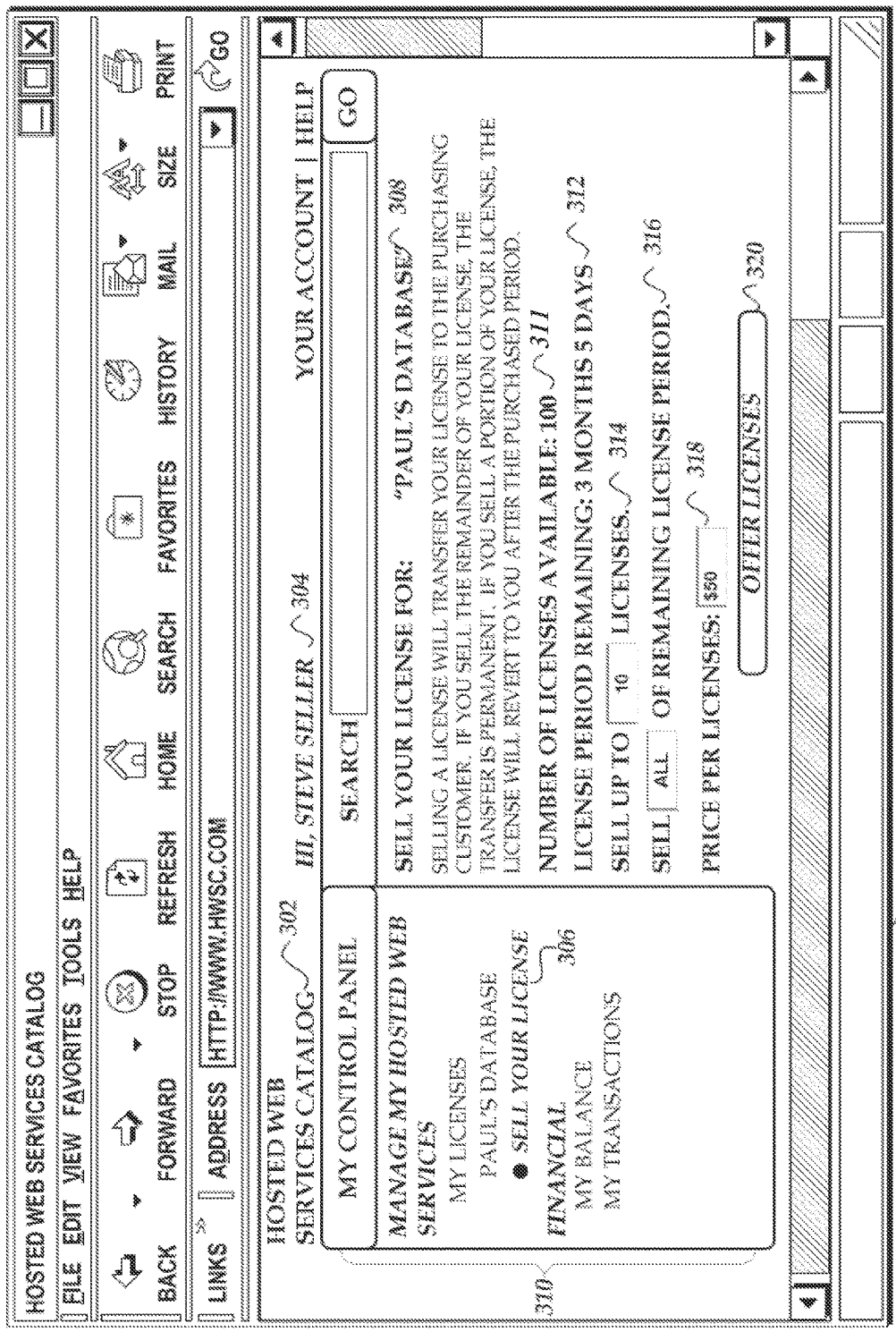
FIG. 4A depicts an illustrative user interface displayed on a seller computing device that enables a seller to offer a service license for sale on the electronic services marketplace shown in FIG. 1.

With reference to FIG. 4A, one example of a user interface 300 enabling a customer to offer for transfer a service license previously acquired via the electronic services marketplace 100 is displayed. As an illustrative example, the user interface 300 may be generated by the marketplace server 112 of the electronic services marketplace 100 and presented on a customer computing device 140 by an application, such as a browser application, on the customer computing device 140. In this example, the user interface 300 may further contain a title reference 302 to the electronic services marketplace 100, i.e., the "Hosted Web Services Catalog," as well as a salutation 304 to the customer currently visiting the electronic services marketplace 100. In the illustrated example, the customer is identified as "Steve Seller." The user interface 300 further contains a navigation panel 310, which directs the customer to various other features offered by the electronic services marketplace 100. Illustratively, units of text within the navigation panel 310 may correspond to interactive links, which modify or change the user interface 300 when selected. In the current example, Steve Seller, has selected link 306, "Sell Your License." Based on this selection, the marketplace server 112 has returned the content for user interface 300.

Through the user interface 300, a customer may submit an offer to sell a service license previously acquired via the electronic services marketplace 100. In this illustrative example, Steve Seller may wish to offer for transfer a service license correspond to "Paul's Database," 308 an illustrative database service offered via the electronic services marketplace 100.

The user interface 300 may display to the customer a number of licenses 311 that are currently acquired by the customer. In this illustrative example, Steve Seller has acquired 100 licenses corresponding to Paul's Database. As described above, each license may enable Steve Seller to execute a single instance of the Paul's Database service. The user interface 300 may further include additional information regarding the license, such as the period remaining on the acquired licenses 312. In this illustrative example, each of the 100 acquired licenses is valid for an additional 3 months 5 days. Though not displayed in FIG. 4A, in some embodiments, the illustrative user interface 300 may display additional information regarding a license, such as the price initially paid for a license or any terms associated with the license or transfer of the license (e.g., transfer fees to be paid to a provider on transfer).

The customer, utilizing a customer computing device 140 may submit, via interface object 314, the number of licenses that the customer would like to offer for transfer. In the illustrated example of FIG. 4A, Steve Seller has elected to offer 10 of the 100 available licenses for transfer. Further, the customer, utilizing a customer computing device 140 may submit, via interface object 316, the period of the license to be transferred. In this illustrative example, Steve Seller has elected to transfer the entirety of the remaining license period: 3 months and 5 days. In some embodiments, a customer may be enabled to offer less than the entirety of a license period for transfer. For example, where a customer elects to transfer only a portion of a remaining license period, the portion of the license which is not transferred may revert to the customer. Illustratively, Steve Seller may elect to offer for transfer 1 month of his remaining 3 months and 5 days. If a customer were to purchase this period, the license may then revert to Steve Seller after 1 month, giving Steve Seller a 2 months and 5 days of remaining license time. In still more embodiments, a customer may be enabled to specify a range of time periods to offer for transfer. Illustratively, Steve Seller may select that customers may purchase any period from 1 month to the entirety of the remaining license period. If a purchasing customer thereafter elects to purchase less than the entirety of the remaining license period, the license may then revert to Steve Seller for any remaining portion. In yet more embodiments, a customer may be enabled to transfer portions of a license to multiple customers for potentially simultaneous use. For example, if Steve Seller current has 3 months and 5 days remaining on a license, he may be enabled to transfer 1 month and 5 days to a first customer A, and 2 months to a second customer B. Illustratively, each of customer A and customer B may then be able to utilize the transferred license to implement the service on a hosted computing environment for the transferred duration.

Though not displayed in FIG. 3A, in some embodiments, a customer may specify actions to be taken by the electronic services marketplace 100 on reversion of a transferred license. For example, a customer may specify that any remaining license portion should also be offered for transfer on the electronic services marketplace 100.

In addition, the customer, utilizing a customer computing device 140 may submit, via interface object 318, the price associated with transfer of a license. In the illustrative depiction of FIG. 4A, Steve Seller has specified that each 3 month, 5 day license be offered for a $50 dollar fee.

Subsequent to inputting any necessary information in input controls 314-318, the customer may select input control 320 to offer a transfer of the service license to other customers of the electronic services marketplace 100. One illustrative user interface displaying such an offer will be described in more detail below with respect to FIG. 5A.

Figure 4B:
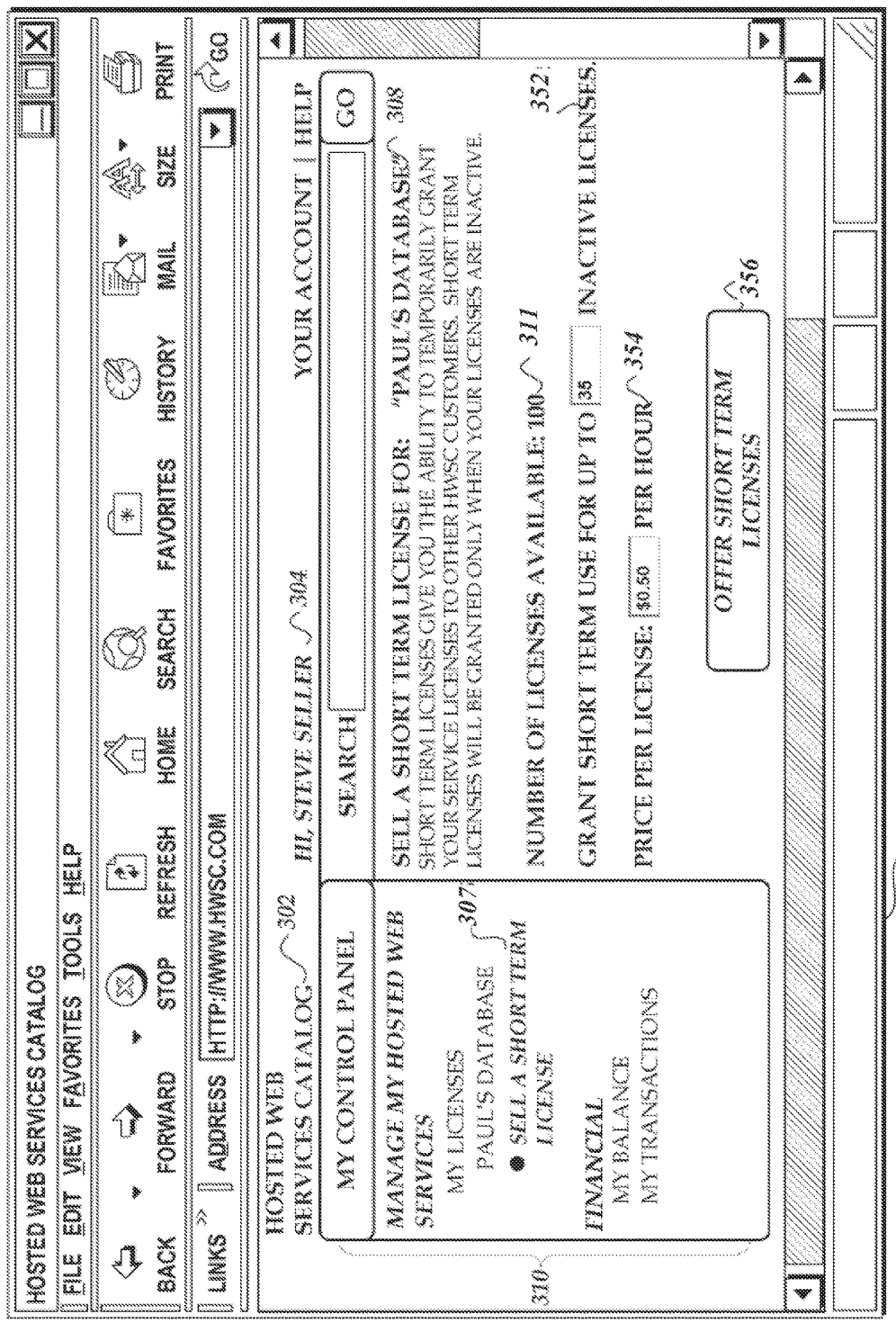
FIG. 4B depicts an illustrative user interface displayed on a seller computing device that enables a seller to offer a temporary service license for sale on the electronic services marketplace shown in FIG. 1.

With reference to FIG. 4B, one example of a user interface 350 enabling a customer to offer a service license for temporary transfer via the electronic services marketplace 100 is displayed. Similarly to as described above with respect to FIG. 4A, the user interface 350 may be generated by the marketplace server 112 of the electronic services marketplace 100 and presented on a customer computing device 140 by an application, such as a browser application, on the customer computing device 140. The user interface 350 may contain a title reference 302 to the electronic services marketplace 100, i.e., the "Hosted Web Services Catalog," as well as a salutation 304 to the customer currently visiting the electronic services marketplace 100. The user interface 300 further contains a navigation panel 310, which directs the customer to various other features offered by the electronic services marketplace 100. Illustratively, units of text within the navigation panel 310 may correspond to interactive links, which modify or change the user interface 350 when selected. In the current example, Steve Seller, has selected link 307, "Sell A Short Term License." Based on this selection, the marketplace server 112 has returned the content for user interface 350.

Through the user interface 350, a customer may submit an offer to temporarily transfer a service license previously acquired via the electronic services marketplace 100. Illustratively, Steve Seller may wish to offer for temporary transfer a service license corresponding to "Paul's Database," 308 an illustrative database service offered via the electronic services marketplace 100. In this example, temporary transfer of a service license may be conditioned on use of the license by the customer initiating the offer. For example, Steve Seller may offer to temporarily transfer a license to use Paul's database only during period in which Steve Seller is not utilizing the licenses. As such, Steve Seller's access to the licenses is not diminished.

As described above with respect to FIG. 4B, the user interface 350 may display to the customer a number of licenses 311 that have previously been acquired by the customer. Though not displayed in FIG. 4B, additional information regarding acquired licenses may also be displayed by user interface 350. For example, user interface 350 may be modified to display fee information associated with use of a service license, the number of service licenses not currently in use, or historical information regarding utilization of service licenses.

The customer, utilizing a customer computing device 140 may submit, via interface object 352, the maximum number of inactive licenses that the customer would like to offer for temporary transfer. In the illustrated example of FIG. 4B, Steve Seller has elected to offer up to 35 of the 100 available licenses for temporary transfer. In this example, when Steve Seller is utilizing less than his 100 available licenses, up to 35 licenses not utilized will be made available for temporary transfer. In some embodiments, the number of licenses which may be made available may be limited (e.g., by terms of the license). In other embodiments, a customer may offer all of their inactive licenses for temporary transfer.

In addition, the customer, utilizing a customer computing device 140 may submit, via interface object 354, the price associated with temporary transfer of a license. In the illustrative depiction of FIG. 4B, a customer may specify a per hour price for use of a temporary license. One skilled in the art will appreciate that additional pricing schemas may be used. In the depicted example, Steve Seller has specified that each temporary license should be offered for a price of $0.50 per hour. In the current example, the price specified in input control 354 is in addition to any per-hour price specified in the terms of the license. Therefore Steve Seller will gain $0.50 for each hour a temporary license is granted, less any fees charged pursuant to the license or by the electronic services marketplace. In other embodiments, the price specified in input control 354 may be the entire price the temporary license transferee is required to pay for use of the license.

Subsequent to inputting any necessary information in input controls 352 and 354, the customer may select input control 356 to offer a license for temporary transfer to other customers of the electronic services marketplace 100. One illustrative user interface displaying such an offer will be described in more detail below with respect to FIG. 5B.

Figure 5A:
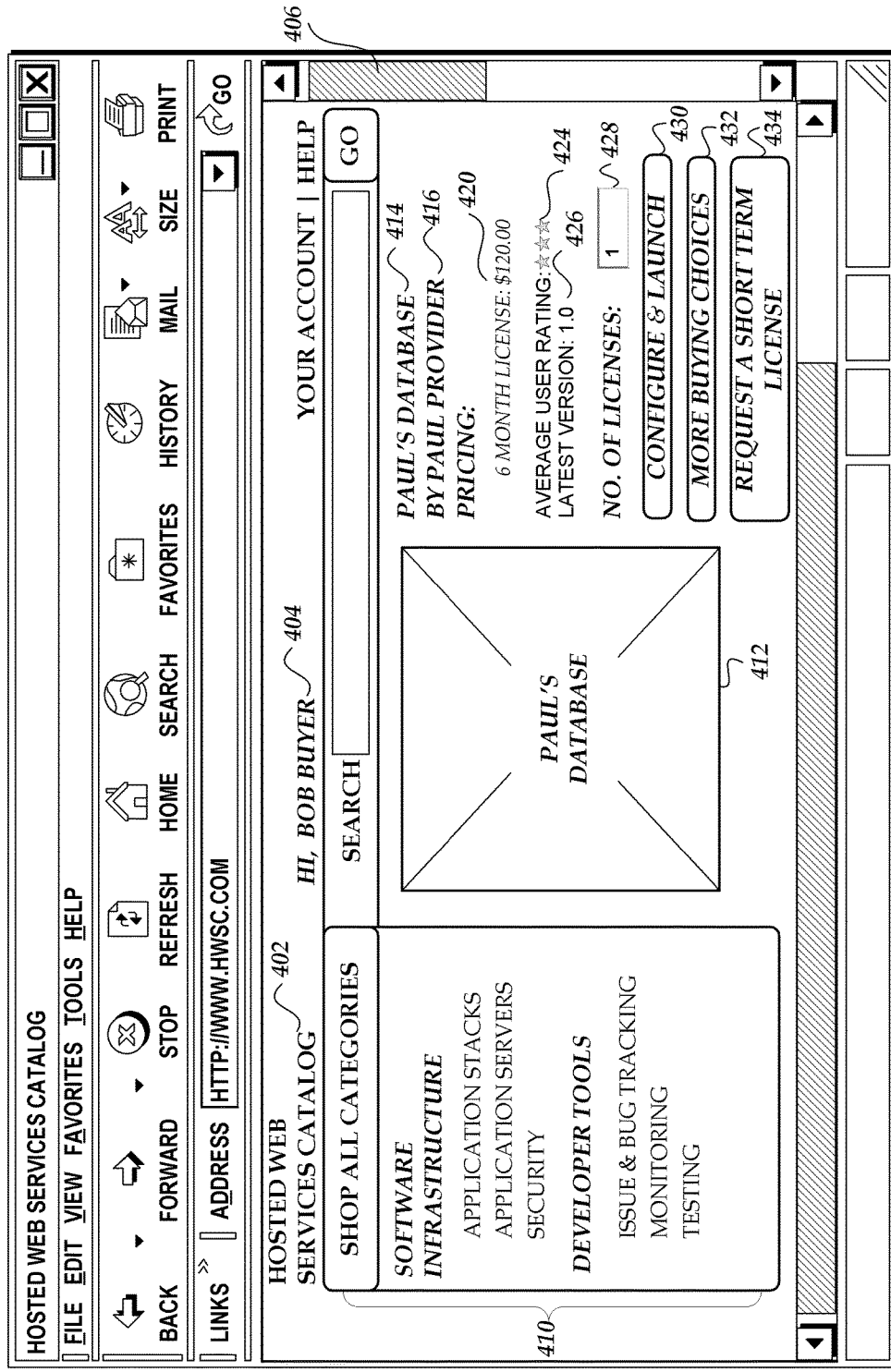
FIG. 5A depicts an illustrative user interface displayed on a purchaser computing device that present information associated with a service image available via the electronic services marketplace shown in FIG. 1, including options to acquire a transferred license and to acquire a temporary license.

FIG. 5A depicts an illustrative user interface 400 displayed on a customer computing device that presents information associated with a service image available via the electronic services marketplace 100. In one embodiment, user interface 400 is generated by marketplace server 112 as a result of navigation by the customer or as a result of selection of a search result returned by the marketplace server 112.

As shown in FIG. 5A, the user interface 400 provides information retrieved from the electronic services marketplace 100, i.e., a "Hosted Web Service Catalog" 402 to "Bob Buyer" 404, an illustrative customer accessing the "Hosted Web Services Catalog." Because the customer is viewing details regarding a specific offered service image, and may wish to browse to other service images, navigation pane 410 is displayed. Navigation pane 410 contains links that enable a customer to browse and select other service images available via the service images marketplace 100. Currently, the user interface 400 depicts information for the service image "Paul's Database," which corresponds to a database service image uploaded by an initial provider. Additional information regarding uploading or providing services are described in more detail in the '227 Application.

Display features 412-434 display information corresponding to the service image. Display feature 412, for example, is a graphic associated with the service image. The graphic may correspond to a logo associated with the service image or with the service image provider. Display features 414 and 416 depict the name of the service image and the provider of the service image, respectively. Display feature 420 depicts pricing information associated with the service image. Display feature 424 depicts reviews given to the service image by users of the "Hosted Web Services Catalog." As depicted, display feature 424 reflects that "Paul's Database" has been given, on average, a three star rating by users of the "Hosted Web Services Catalog." As will be appreciated by those skilled in the art, various other methods of displaying a rating of a service image may be employed. Display feature 426 depicts a version number of the service image; in the current example, version 1.0. In some embodiments, display feature 426 may be selectable to view alternative versions of the selected service image that are available. This may be desirable, for example, where previous versions have different desired characteristics, such as different pricings, features, compatibility, or ratings.

Input box 428 may be utilized by the customer to specify a number of licenses of the selected service that the customer desires. Illustratively, each license may enable a customer to execute a single instance of the service on a hosted computing environment. In other embodiments, a license may enable a specific number of instances of the service to be executed. One skilled in the art will appreciate that the terms of a license may include various additional or alternative terms. Generally speaking, an instance refers to an individual computing device—virtual or physical—which has executed, loaded, or launched the selected service. A customer may wish to acquire multiple licenses, for example, where the customer wishes to distribute processing or load access across multiple instances. In other examples, multiple instances may be functional to interact, or to provide different functionality via the same service. The number of licenses specified by input box 428 may optionally be associated with a default value, such that the customer is not required to select a number of licenses.

After inputting the desired number of licenses (if necessary), the customer may activate input control 430 to further configure and launch the viewed service image. One example of a user interface used to further configure and launch a service image is discussed in detail in the '227 Application.

In addition, a customer may activate input control 432 in order to view additional purchasing options associated with the service. In this illustrative example, additional purchasing options may correspond to transferring a license from another customer of the electronic service marketplace. Illustratively, selection of input control 432 may display a user interface describing licenses available for transfer, and enabling a customer to select such a transferred license for purchase. One such illustrative user interface will be described in more detail with respect to FIG. 5B, below.

Still further, a customer may activate input control 434 in order to request a temporary licenses associated with the service. In this illustrative example, requesting a temporary license may correspond to temporarily transferring a license from another customer of the electronic service marketplace during periods in which an instance is not utilizing the license. Illustratively, selection of input control 434 may display a user interface allowing a customer to specify a maximum price for a temporary license and other preferences for a temporary license request. One such illustrative user interface will be described in more detail with respect to FIG. 5C, below.

Though not displayed herein, the user interface 400 may display additional information regarding a service, such as similar services or configuration options of a service. Examples of additional information are described in more detail in the '227 Application.

Figure 5B:
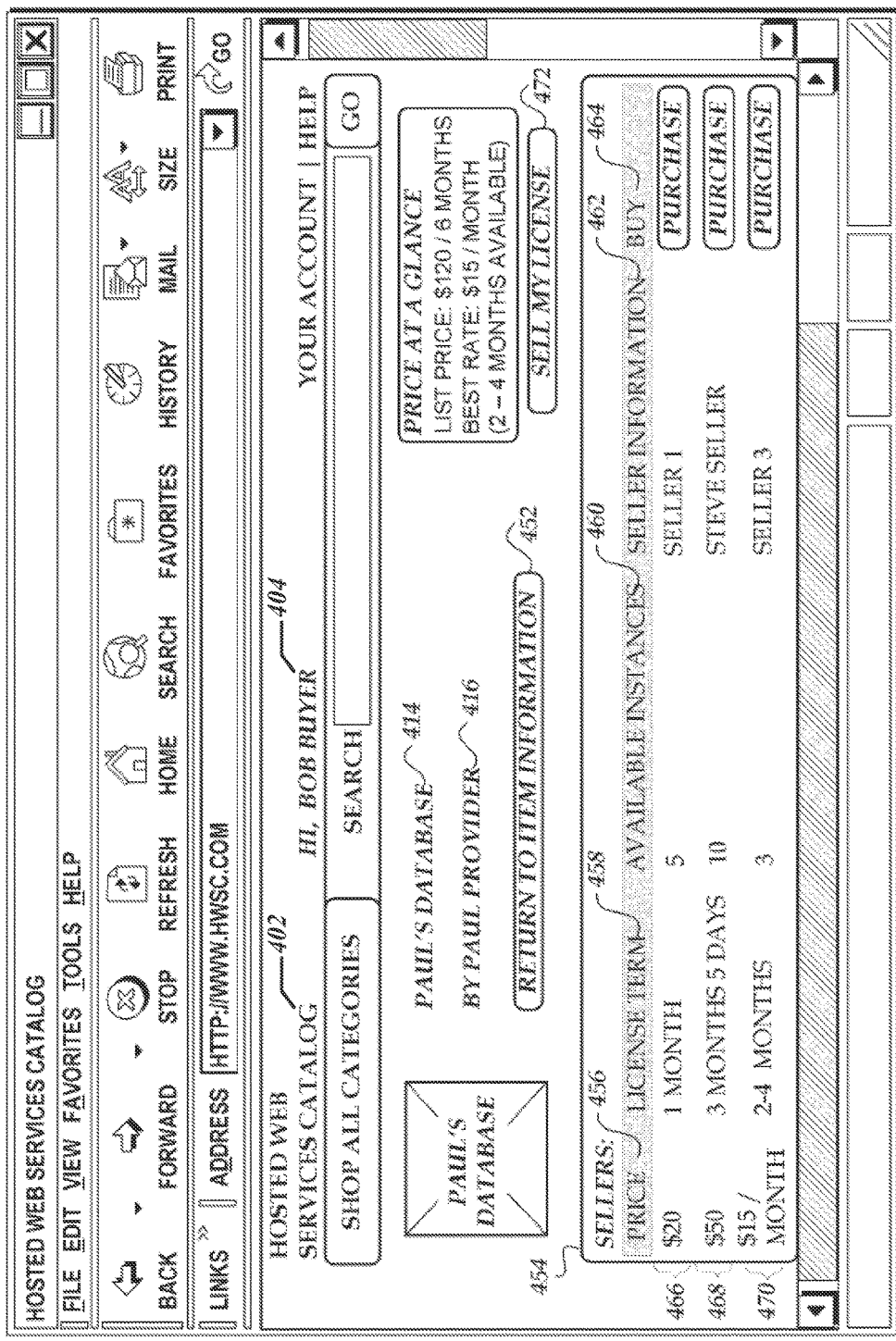
FIG. 5B depicts an illustrative user interfaces displayed on a purchaser computing device that present information associated with transferring a license corresponding to a service via the electronic services marketplace shown in FIG. 1.

With reference to FIG. 5B, one example of a user interface 450 for providing information regarding acquisition of transferred licenses corresponding to services is displayed. The user interface 450 may be displayed, for example, by user selection of input control 432 of FIG. 5A ("More Buying Choices"). As shown in FIG. 5B, the user interface 450 enables a customer to receive information regarding service licenses offered for transfer by other customers of the electronic services marketplace 100, i.e., the "Hosted Web Services Catalog" 402. The current user 404 of the "Hosted Web Services Catalog" is Bob Buyer, an illustrative customer and transferee of a service license. In this illustrative example, Bob Buyer has selected to view available service licenses corresponding to "Paul's Database" for transfer.

In the illustrative user interface 450 of FIG. 5B, display feature 414 reflects the title of the service corresponding to the license which the customer wishes to purchase. Input control 452 allows the customer to return to general information regarding the service, such as is displayed in user interface 400 of FIG. 5A. Display element 454 reflects details regarding licenses available for transfer from other customers of the electronic services marketplace 100. As illustrated in FIG. 5B, display element 454 includes information regarding the price 456, license term 458, number of available licenses 460, and the seller 462 of the transferred license. Display element 472 enables a customer to sell their own license corresponding to Paul's Database. Selection of display element 472 may lead, for example, to a user interface similar to the user interface 300 described above with respect to FIG. 4A. Display element 472 further includes controls under buy column 464, each of which enables a customer to transfer the offered license from the selling customer.

As shown in FIG. 5B, information regarding three sellers of transferred licenses is displayed, corresponding to licenses offered by Seller 1, displayed by row 466, licenses offered by Steve Seller, displayed by row 468, and licenses offered by Seller 3, displayed by row 470. Each offered license is associated with various pricing, terms, and availability. Illustratively, row 468 corresponding to licenses offered for transfer by Steve Seller may correspond to an offer created by use of the user interface 300 of FIG. 4A.

In this illustrative user interface 450, Bob Buyer may select to transfer a license from the license seller to himself by selecting the "Purchase" input control under column 464. For example, if Bob Buyer were to select the "Purchase" input control corresponding to Steve Seller, a license corresponding to "Paul's Database" that had previously been acquired by Steve Seller would be transferred to Bob Buyer. As described above, Bob Buyer may be required to pay a fee to Steve Seller, to the provider of Paul's Database, or to the electronic services marketplace 100 for transfer of the license. Thereafter, Bob Buyer may utilize the license in order to implement the Paul's Database service, subject to the terms of the license. For example, Bob Buyer may not be required to pay the monthly license fee normally associated with a license to Paul's Database (e.g., because such a fee was already paid by Steve Seller), but may still be required to pay any usage fees associated with use of the Paul's Database service.

As describe above, in some instances, multiple license terms may be offered for a potential license transfer. For example, in the user interface 450 of FIG. 5B, row 470 reflects that Seller 3 is offering licenses between 2-4 months. In these instances, selection of the "Purchase" input control may enable a customer to specify the duration of the license they wish to acquire. In some embodiments, selection of the "Purchase" input control may enable a customer to specify additional parameters, such as the number of licenses desired, or to view additional information regarding a license transfer. In other embodiments, additional information or input controls enabling a customer to specify additional parameters may be included within the user interface 450.

Figure 5C:
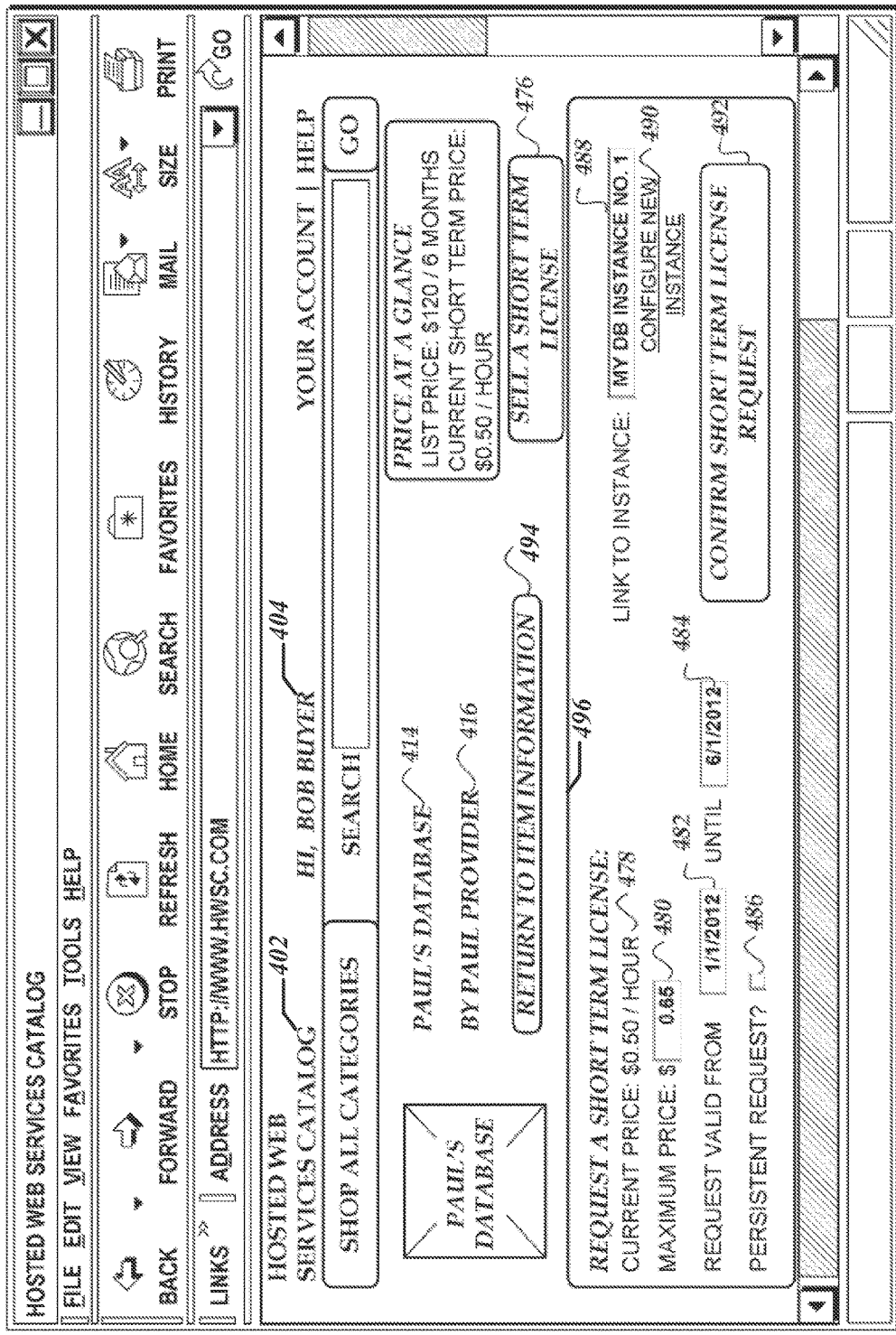
FIG. 5C depicts an illustrative user interfaces displayed on a purchaser computing device that present information associated with acquiring a temporary license corresponding to a service via the electronic services marketplace shown in FIG. 1.

With reference to FIG. 5C, one example of a user interface 474 for providing information regarding acquisition of temporary licenses corresponding to services is displayed. The user interface 474 may be displayed, for example, by user selection of input control 434 of FIG. 5A ("Request a Short Term License"). As shown in FIG. 5C, the user interface 474 enables a customer to configure a request to acquire a temporary service license. Such a temporary service license may correspond to service licenses offered for temporary transfer by other customers of the electronic services marketplace 100, i.e., the "Hosted Web Services Catalog" 402.

The current user 404 of the "Hosted Web Services Catalog" is Bob Buyer, an illustrative customer. In this illustrative example, Bob Buyer has selected to configure a request to acquire a temporary license corresponding to the "Paul's Database" service.

In the illustrative user interface 474 of FIG. 5C, display feature 414 reflects the title of the service corresponding to the license which the customer wishes to purchase. Input control 494 allows the customer to return to general information regarding the service, such as is displayed in user interface 400 of FIG. 5A. Display element 476 enables a customer to sell their own temporary license corresponding to Paul's Database.

Display element 496 enables a customer to view details regarding temporary license transfers as well as to specify criteria for temporary transfer of a license to the customer. As illustrated in FIG. 5C, display element 496 includes information regarding the current price for temporary transfer 478. In this illustrative example, the current price is a per hour price. In some embodiments, the current price for a temporary transfer may correspond to different pricing information, such as a fixed fee for each temporary transfer (e.g., of a fixed duration), or a fee for other usage metrics of a license (e.g., gigabytes of data stored or processed, discreet units of data stored or processed, etc.).

A customer may utilize input controls 480-486 to specify criteria for temporary transfer of a license. For example, input control 480 may allow a customer to specify a maximum price to pay for a temporary license. In the illustrative user interface 474 of FIG. 5C, Bob Buyer has specified that no more than 65 cents per hour should be paid to use a license corresponding to Paul's Database. As such, if Bob Buyer submits the displayed request to acquire a temporary license, he would be granted a temporary license at the lowest offered rate until no rate less than or equal to 65 cents per hour was available. Illustratively, rates for temporary licenses may be determined by the price specified by other customers offering to grant temporary licenses to the service. For example, as discussed above with respect to FIG. 4B, Steve Seller may have elected to offer 35 temporary licenses corresponding to Paul's Database at a rate of 50 cents per hour. This may be the lowest available price for a temporary license corresponding to Paul's Database, as reflected by display element 478. If each of these 35 temporary licenses are purchased by other customers of the electronic services marketplace 100, they would no longer be available for purchase by Bob Buyer. As such, the current price for a temporary instance reflected by display element 478 may increase to reflect prices offered by other additional customers. Further, Steve Seller may utilize some or all of the 35 licenses, leaving less available for temporary transfer and potentially increasing the current lowest price for temporary transfer of a license.

Input control 482 may enable a customer to specify a time period during which the request to acquire a temporary license will be valid. For example, input control 482 enables a customer to specify a beginning to the period during which the request will be valid. Input control 484 enables a customer to specify an end to the period during which the request will be valid. Illustratively, Bob Buyer has request a temporary license any time between Jan. 1, 2012 and Jun. 1, 2012. In this illustrative example, a temporary license will only be granted if it is available within these time periods.

Input control 486 may enable a customer to specify whether a request should be persistent. In some embodiments, a non-persistent request may be satisfied only one time, such that after it is satisfied (e.g., a temporary license is granted), the request is removed. However, the customer may specify that a request should be persistent. A persistent request may be automatically resubmitted until the persistent request is canceled. For example, Bob Buyer may acquire a temporary license to implement Paul's Database. On revocation of the temporary license (e.g., if Bob Buyer shuts down the instance using the license or the price of the licenses rises too high), a non-persistent request would be fulfilled and therefore removed. However, a persistent request would then be automatically resubmitted, such that the request will be fulfilled again should the price per temporary license drop below the maximum price specified in input control 480.

Input control 488 may enable a customer to specify an instance to link to the requested temporary license. Illustratively, this instance may correspond to an execution of the service (or a service image implementing the service) on a hosted computing environment. For example, in the illustrative user interface 474 of FIG. 5C, Bob Buyer may elect to link a created temporary license request to "My DB Instance No. 1." This instance may require a valid license for "Paul's Database" in order to function. In this example, fulfillment of the temporary license may cause execution of the linked instance, such that the temporary license may be immediately utilized. Input control 490 may enable a customer to configure a new instance to link with the request to acquire a temporary license. Configuration of instances is described in more detail in the '227 Application.

In some embodiments, temporary licenses to services may be used in conjunction with temporary allocation of computing resources (e.g., corresponding to resources implementing a licensed service on a hosted computing environment). Examples of systems and methods for temporarily allocating computing resources are given in U.S. patent application Ser. No. 12/686,273 entitled "Managing Private Use of Program Execution Capacity," and filed Jan. 29, 2010, which is hereby incorporated by reference in its entirety (the '273 Application). Further, techniques detailed in the '273 Application related to use of computing resources may similarly be applied to use of licenses corresponding to services.

Subsequent to entering any necessary information in input controls 480-488, a customer may select input control 492 in order to submit the request to acquire a temporary license. Thereafter, the electronic services marketplace may monitor all offered temporary licenses and grant a temporary license to Bob Buyer as long as the price for such a license is below Bob Buyers specified maximum price.

Figure 6:
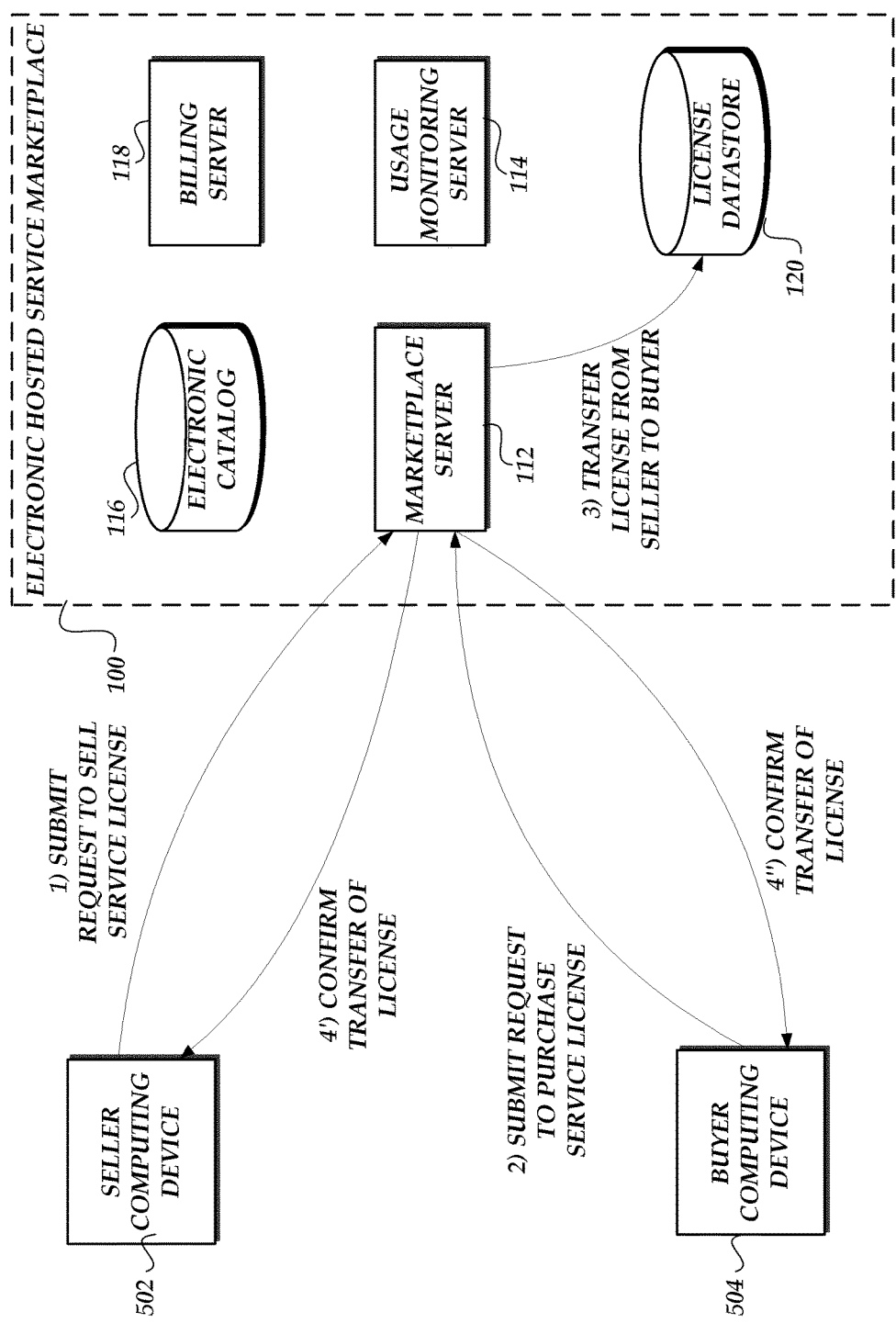
FIG. 6 is a block diagram depicting the transfer of a service license between a seller computing device and a buyer computing device via the services marketplace shown in FIG. 1.

FIG. 6 is a block diagram depicting the transfer of a license corresponding to a service offered on the electronic services marketplace 100 by the customer and launching of the service on a hosted computing environment associated with the electronic services marketplace 100. Specifically, FIG. 6 depicts the transfer of a license from a seller associated with a seller computing device 502 to a buyer associated with a buyer computing device 504. Each of the seller computing device 502 and buy computing device 504 may correspond, for example, to a customer computing device 140 of FIG. 1. For example, the seller computing device may be associated with Steve Seller of FIGS. 3A-B, while the buyer computing device may be associated with Bob Buyer of FIGS. 4A-C.

In this regard, a seller utilizing a seller computing device 502, may, at (1), submit a request to sell a license corresponding to a service available via the electronic services marketplace 100. The request may, for example, be processed by the marketplace server 112 of the electronic services marketplace 100. Example illustrations of a user interface for submitting a request to sell a service license are discussed in more detail with respect to FIGS. 4A and 3B, above. In the illustrative interaction of FIG. 6, the submitted request may correspond to an offer to permanently transfer all or a portion of the license. Further, the submitted request may correspond to an offer to temporarily transfer the license (e.g., during periods when the license is not used by the seller). Transfer of temporary licenses will be discussed in greater detail below with respect to FIG. 7.

The marketplace server 112 may further receive a request to purchase the offered service license from a buyer computing device 504. Though depicted as subsequent to the offer to sell a service license transmitted by the seller computing device 502, in some embodiments, buyer computing devices 504 may be enabled to submit requests to purchase a service license even if no matching service licenses are available for purchase. Thereafter, a seller computing device 502 may submit a matching offer to sell a service license, and the illustrative interaction of FIG. 6 may proceed. Example illustrations of a user interface for submitting a request to purchase a service license are discussed in more detail with respect to FIGS. 5B and 4C, above.

After receiving matching offers to sell a service license and to purchase a service license, the marketplace server 112 may, at (3) facilitate transfer of the service license from the seller to the buyer. This may include, for example, modifying license information within the license datastore 120 to reflect that the license now corresponds to the buyer. Though not shown in FIG. 4, additional actions may be taken by the electronic services marketplace 100 in response to transfer of a license. For example, the marketplace server 112 may interact with a hosted computing environment, such as the marketplace hosted computing environment 122 of FIG. 1, in order to halt any instances executed on behalf of the seller than are dependent upon the transferred license. Further, the marketplace server 112 may interact with a hosted computing environment, such as the marketplace hosted computing environment 122 of FIG. 1, in order to implement an instance dependent on the transferred license on behalf of the buyer. In addition, the marketplace server 112 may interact with the billing server 118 in order to bill either the buyer, the seller, or both in conjunction with the transfer (e.g., as agreed within the transfer or as set forth in the service license).

In some embodiments, modification of the license datastore 120 may correspond to removing the association of the license with the seller, and creating an association of the license with the buyer. In other embodiments, modification of the license datastore 120 may correspond to creating a temporary license associated with the buyer. For example, where the service license transferred in the illustrative interaction of FIG. 6 is a temporary license, the license may remain associated with the seller, and a temporary license may be created corresponding to the buyer. Information corresponding to the seller in the license datastore 120 may be modified to reflect that a temporary license has been granted.

Subsequent to modifying the information in the license datastore 120 to reflect the transfer, the marketplace server 112 may, at (4') and (4") transmit a confirmation to both the buyer computing device 502 and the seller computing device 504 reflecting successfully transfer of the license. In some embodiments, such a confirmation may further include information regarding the hosted services corresponding to the license. For example, the seller may be notified that a corresponding instance of the service that was dependent on the license has been halted. As a further example, the buyer may be notified that a new instance service has been or may be created.

Figure 7:
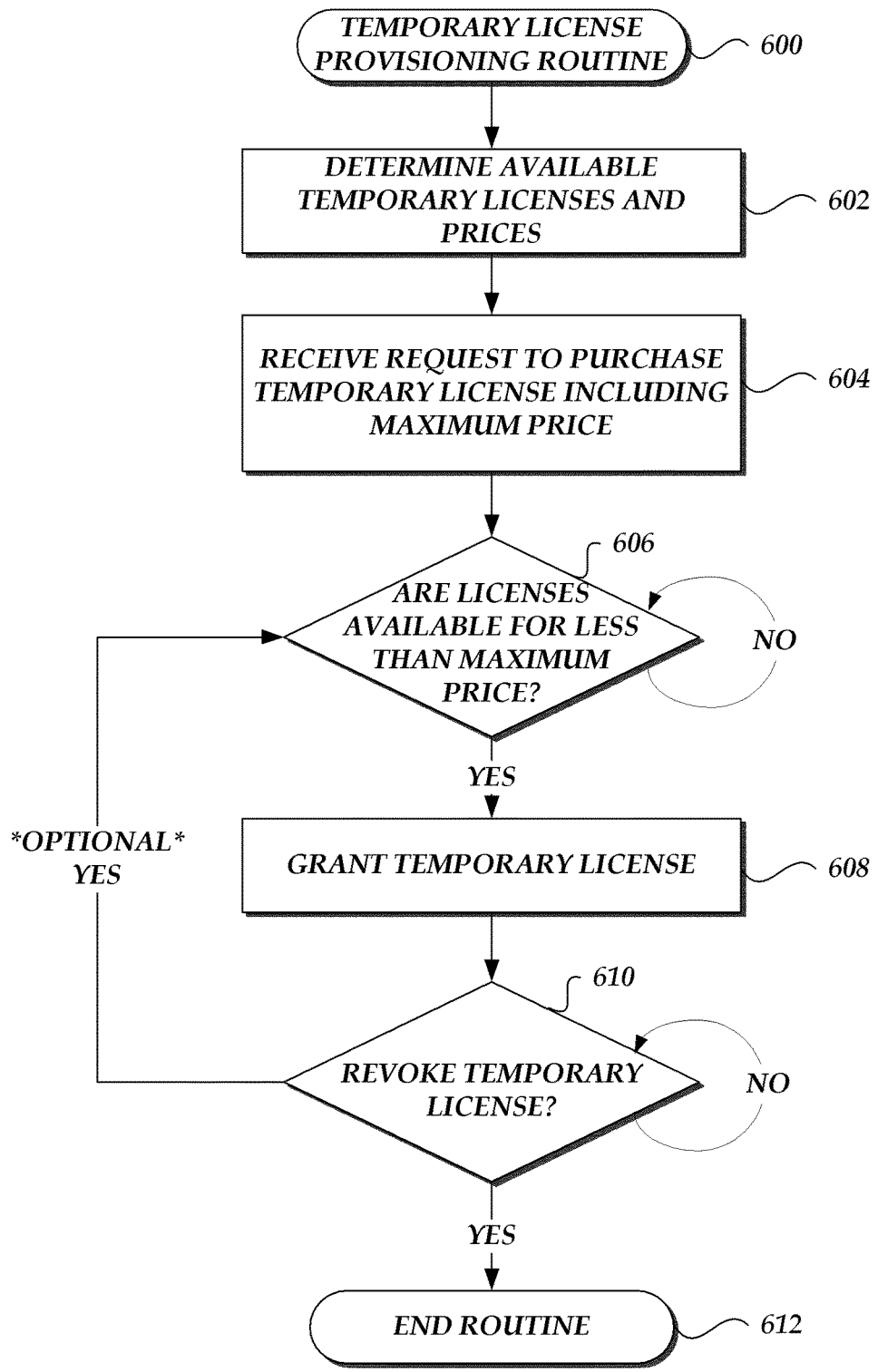
FIG. 7 is a flow diagram depicting an illustrative routine for providing a temporary license corresponding to a hosted service available from the electronic services marketplace of FIG. 1.

FIG. 7 is a flow diagram depicting an illustrative routine 600 for providing temporary licenses corresponding to a service. The routine 600 may illustratively be implemented by the marketplace server 112 of the electronic services marketplace 100 of FIG. 1. The routine 600 begins at block 602, after receiving a request to acquire a temporary license corresponding to a service from a customer computing device, the request including license criteria usable to select a desirable temporary license. By way of non-limiting example, the usage criteria may correspond to a maximum price the customer is willing to pay for acquiring or maintaining a temporary license or to a period during which the temporary license should be acquired or maintained. Illustratively, a customer may submit such a request by selection of input control 492 of FIG. 5C.

At block 604, the marketplace server 112 may determine the number of available temporary licenses corresponding to the desired temporary license, as well as the price associated with each temporary license. Each available temporary license may correspond to a customer offer to temporarily transfer a license as discussed above with respect to FIG. 4B. Further, each available temporary license may correspond to a license not being utilized by either the customer offering the temporary license or by another customer who may have purchased a temporary license. As such, each available temporary license may correspond to previously acquired, currently unutilized license corresponding to a service available via the electronic services marketplace 100. As described above in more detail with respect to FIG. 4B, each offered temporary license may be associated with a price for use of the temporary license. For example, a customer acquiring a temporary license may be required to pay $0.50 for every hour the temporary license is utilized.

At block 606, the marketplace server 112 may determine whether any temporary licenses are available which match the license criteria of the received customer request. For example, the received license criteria may specify that no more than $0.65 per hour should be paid to acquire or maintain a temporary license. Further, the license criteria may specify that the temporary license should only be acquired or maintained between January of 2012 and July of 2012. At block 606, therefore, the marketplace server 112 may determine whether the current time period conforms to the license criteria, and whether any offered temporary licenses are available for $0.65 per hour or less. If no temporary licenses are available which meet the customer specified criteria, the routine may continue to monitor available temporary licenses at block 606 until such a license is available. Temporary licenses may become available, for example, if a customer offers a new temporary license for transfer, or if a previously offered temporary license becomes unused (e.g., by the offering customer or by another customer who previously purchased the temporary license). In some embodiments, criteria may become impossible to meet. For example, the time period specified within the license criteria may elapse. In instances where license criteria become impossible to satisfy, the routine 600 may end.

After a temporary license becomes available that satisfies the received license criteria, the marketplace server 112, at block 608, may grant a temporary license to the requesting customer. Illustratively, block 608 may be associated with a number of additional actions. For example, the marketplace server 112 may modify information stored within a license information datastore, such as license information datastore 112 of FIG. 1, to reflect granting of the temporary license. Further, the marketplace server 112 may interact with the billing server to fulfill any billing that results from granting the temporary license (e.g., payment from the requesting customer to the offering customer, payment to the initial provider of the license, etc.). Still further, the marketplace server 112 may interact with a hosted computing environment in order to implement a service utilizing the temporary license.

At block 610, the marketplace server 112 may determine whether to revoke the previously granted temporary license. Revocation may occur, for example, if the customer offering the temporary license requires use of the license. Illustratively, Steve Seller may have previously granted a temporary license to an instance of Paul's Database for use during off-peak periods. If that temporary license is still granted at the beginning of a peak period, and Steve Seller requires use of the license in order to implement an additional instance of the Paul's Database service, the temporary license would then be revoked. In addition, a seller may manually request revocation of a temporary license. As such, the temporary license may be revoked, and any instances requiring the temporary license may be halted. In the absence of cause to revoke a temporary license, the routine may continue at block 610 until such time that the temporary license should be revoked.

In some embodiments, the routine 600 may be configured, after determining that revocation of a temporary license should occur, to return to block 606. Illustratively, this may enable an instance dependent upon a temporary license to continue to function. For example, Bob Buyer may have previously acquired a temporary license from Steve Seller, which is subsequently revoked. However, a temporary license may be available from another customer which corresponds to license criteria submitted by Bob Buyer. As such, Bob Buyer may be granted an additional temporary license subject to the terms of that new license (e.g., subject to a price specified by the seller of the new temporary license). In some embodiments, immediate or near-immediate transfer from a first temporary license to a second temporary license may enable an instance of a service dependent on a temporary license to continue without halting.

In other embodiments, license criteria may specify that a temporary license request should be made persistent. In these embodiments, the routine may continue at block 606 regardless of whether an additional temporary license matching the license criteria is currently available. This may enable, for example, a temporary license to again be granted as soon as a temporary license satisfying the customer's license criteria becomes available.

In some embodiments, the marketplace server 112 may determine that additional temporary licenses are not desired by the customer. After such a determination, the routine may end at block 612.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing transfer of a license corresponding to a service implemented on a hosted computing environment, the computer-implemented method comprising:
    as implemented by one or more computing devices configured with specific executable instructions,
    receiving a set of offers corresponding to the service, wherein each offer is associated with a transfer fee, and wherein each offer corresponds to an offer to temporarily transfer the license to use the service during periods in which the license is not in use;
    receiving, from a computing device associated with a first user, a request to obtain a temporary license corresponding to the service, wherein the request includes a maximum payment amount;
    determining a first offer from the set of offers based at least in part on the maximum payment amount, wherein a first license associated with the first offer is not in use by a second user;
    transferring the first license associated with the first offer to the first user from the second user;
    determining that an instance of the service is executing on behalf of the first user while another instance of the service is not executing on behalf of the second user;
    receiving, from a computing device of the second user, a request to revoke the first license; and
    without halting execution of the instance that is executing on behalf of the first user:
        automatically determining a second offer from the set of offers based at least in part on the maximum payment amount, wherein the second offer is associated with a second license to use the service and wherein the second license is not in use by a third user,
        automatically transferring the second license to the first user from the third user, and
        in response to transferring the second license to the first user from the third user, revoking the first license from the first user.

2. The computer-implemented method of claim 1, wherein a transfer fee of the first license corresponds to a usage fee associated with use of the first license.

3. The computer-implemented method of claim 2, wherein the usage fee associated with use of the first license is determined based on at least one of a bandwidth use of the service using the first license or a number of operations performed by the service using the first license.

4. The computer-implemented method of claim 1, wherein the transfer fee of the first license corresponds to a fee paid at least in part to a user associated with the first offer.

5. The computer-implemented method of claim 1, wherein the transfer fee of the first license corresponds to a fee paid at least in part to a provider of the service.

6. A system for managing transfer of a license corresponding to a service implemented on a hosted computing environment, the system comprising:
    an electronic data store that stores a set of offers corresponding to the service, wherein each offer is associated with a fee, wherein each offer corresponds to an offer to temporarily transfer the license to use the service during periods in which the license is not in use; and
    a computing device in communication with the electronic data store, the computing device configured to:
    receive, from a user computing device associated with a first user, a request to obtain the license corresponding to the service, wherein the request includes a maximum payment amount;
    determine a first offer from the set of offers based at least in part on the maximum payment amount, wherein the first offer is associated with a first license that is not in use by a second user;
    transfer the first license associated with the first offer to the first user from the second user;
    determining that an instance of the service is executing on behalf of the first user while another instance of the service is not executing on behalf of the second user;
    receive, from a computing device of the second user, a request to revoke the first license; and
    without halting execution of the instance that is executing on behalf of the first user:
    automatically determine a second offer from the set of offers based at least in part on the maximum payment amount, wherein the second offer is associated with a second license to use the service and wherein the second license is not in use by a third user,
    automatically transfer the second license to the first user from the third user, and
    in response to transferring the second license to the first user from the third user, revoke the first license from the first user.

7. The system of claim 6, wherein the computing device is further configured to implement the instance of the service on the hosted computing environment on behalf of the first user.

8. The system of claim 6, wherein receiving, from the second user, the request to revoke the first license comprises receiving an indication of a desired use of the first license by the second user.

9. The system of claim 6, wherein the computing device is further configured to:
revoke the second license from the first user; and
in conjunction with revocation of the second license from the first user, halt the execution of the instance of the service that is executing on behalf of the first user.

10. The system of claim 6, wherein the computing device is further configured to receive payment from the first user, wherein the payment corresponds to transfer of the first license to the first user from the second user.

11. The system of claim 10, wherein the computing device is further configured to pay the second user at least a portion of the payment that is received from the first user.

12. A computer-readable, non-transitory storage medium having computer-executable instructions for managing transfer of a license corresponding to a service implemented on a hosted computing environment, wherein the computer-executable instructions, when executed by one or more processors, cause the one or more processors to perform operations comprising:
receiving, from a computing device associated with a first user, a request to obtain the service, wherein the request includes a maximum payment amount;
determining a first offer from a set of offers corresponding to the service based at least in part on the maximum payment amount, wherein each offer of the set of offers is associated with a fee and corresponds to an offer to temporarily transfer a license to use the service during periods when the license is not in use, wherein the first offer is associated with a first license that is not in use by a second user;
transferring the first license associated with the first offer to the first user from the second user;
determining that an instance of the service is executing on behalf of the first user while another instance of the service is not executing on behalf of the second user;
receiving, from a computing device of the second user, a request to revoke the first license; and
without halting execution of the instance that is executing on behalf of the first user:
automatically determining a second offer from the set of offers based at least in part on the maximum payment amount, wherein the second offer is associated with a second license to use the service and wherein the second license is not in use by a third user,
automatically transferring the second license to the first user from the third user, and
in response to transferring the second license to the first user from the third user, revoking the first license from the first user.

13. The computer-readable, non-transitory storage medium of claim 12, wherein the operations further comprise implementing the instance of the service on the hosted computing environment on behalf of the first user.

14. The computer-readable, non-transitory storage medium of claim 12, wherein receiving, from a computing device of the second user, the request to revoke the first license comprises receiving an indication of a desired use of the first license by the second user.

15. The computer-readable, non-transitory storage medium of claim 14, wherein the operations further comprise:
revoke the second license from the first user; and
in conjunction with revocation of the second license from the first user, halting the execution of the instance of the service that is executing on behalf of the first user.

16. A computer-implemented method for managing transfer of a license corresponding to a service implemented on a hosted computing environment, the computer-implemented method comprising:
as implemented by one or more computing devices configured with specific executable instructions,
receiving, from a user computing device associated with a first user, a request to obtain a temporary license to use the service, wherein the request includes a maximum payment amount;
determining a first offer to temporarily transfer a first license to use the service based at least in part on the maximum payment amount, wherein the first offer corresponds to an offer to temporarily transfer the first license during periods when the first license is not in use by a second user;
transferring the first license associated with the first offer to the first user from the second user;
determining that an instance of the service is executing on behalf of the first user while another instance of the service is not executing on behalf of the second user;
receiving, from a computing device of the second user, a request to revoke the first license; and
without halting execution of the instance that is executing on behalf of the first user:
automatically determining a second offer based at least in part on the maximum payment amount, wherein the second offer is associated with a second license to use the service and wherein the second license is not in use by a third user,
automatically transferring the second license to the first user from the third user, and
in response to transferring the second license to the first user from the third user, revoking the first license from the first user.

17. The computer-implemented method of claim 16, further comprising implementing the instance of the service on the hosted computing environment on behalf of the first user.

18. The computer-implemented method of claim 16, wherein receiving, from the second user, the request to revoke the first license comprises receiving an indication of a desired use of the first license by the second user.

19. The computer-implemented method of claim 18 further comprising:
revoking the second license from the first user; and
in conjunction with revocation of the second license from the first user, halting the execution of the instance of the service that is executing on behalf of the first user.

20. The computer-implemented method of claim 16 further comprising receiving a first payment from the first user, wherein the first payment corresponds to transfer of the first license to the first user from the second user.

21. The computer-implemented method of claim 20 further comprising, based on receiving the first payment from the user, transferring a second payment to a provider associated with the service.

22. The computer-implemented method of claim 16, wherein receiving, from the computing device of the second user, the request to revoke the first license comprises determining that the instance of the service is executing on behalf of the first user while another instance of the service is executing on behalf of the second user.

* * * * *